(12) United States Patent
Liu et al.

(10) Patent No.: US 11,706,443 B2
(45) Date of Patent: Jul. 18, 2023

(54) CONSTRUCTION OF AFFINE CANDIDATES IN VIDEO PROCESSING

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Jizheng Xu, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/316,199

(22) Filed: May 10, 2021

(65) Prior Publication Data
US 2021/0281875 A1 Sep. 9, 2021

Related U.S. Application Data

(63) Continuation of application No. PCT/CN2019/119210, filed on Nov. 18, 2019.

(30) Foreign Application Priority Data

Nov. 17, 2018 (WO) ................ PCT/CN2018/116067
Dec. 21, 2018 (WO) ................ PCT/CN2018/122626
(Continued)

(51) Int. Cl.
*H04N 19/52* (2014.01)
*H04N 19/109* (2014.01)
(Continued)

(52) U.S. Cl.
CPC ........... *H04N 19/52* (2014.11); *H04N 19/105* (2014.11); *H04N 19/109* (2014.11);
(Continued)

(58) Field of Classification Search
None
See application file for complete search history.

(56) References Cited

U.S. PATENT DOCUMENTS 7,920,628 B2 4/2011 Kojokaro et al.
8,379,723 B2 2/2013 Chiu et al.
(Continued)

FOREIGN PATENT DOCUMENTS

AU  2010288269 A1  3/2012
CN     1456999 A   11/2003
(Continued)

OTHER PUBLICATIONS

Akula et al. "Description of SDR, HDR and 360 degree Video Coding Technology Proposal Considering Mobile Application Scenario by Samsung, Huawei, GoPro, and HiSilicon," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0024, 2018.

(Continued)

*Primary Examiner* — Reza Aghevli
(74) *Attorney, Agent, or Firm* — Perkins Coie LLP

(57) ABSTRACT

A method of video processing is provided. The method includes: determining, for a conversion between a current video block of a video and a coded representation of the video, a mode of operation of an UMVE mode; and performing the conversion based on the determining, wherein the current video block is coded with an affine merge mode and motion vector differences in the affine UMVE mode, and wherein one or more fields in the coded representation (Continued)

correspond to the mode of operation, and wherein the one or more fields include: a list size field that indicates a size of a base affine merge candidate list for an affine merge mode with prediction offsets that is used by the UMVE mode, or a table field that signals a distance table or a direction table for the affine merge mode with prediction offsets.

18 Claims, 23 Drawing Sheets

(30) Foreign Application Priority Data

Dec. 29, 2018 (WO) ................ PCT/CN2018/125417
Jan. 23, 2019 (WO) ................ PCT/CN2019/072814

(51) Int. Cl.
*H04N 19/176* (2014.01)
*H04N 19/46* (2014.01)
*H04N 19/105* (2014.01)
*H04N 19/139* (2014.01)
*H04N 19/184* (2014.01)
*H04N 19/70* (2014.01)
*H04N 19/129* (2014.01)
*H04N 19/137* (2014.01)
*H04N 19/196* (2014.01)

(52) U.S. Cl.
CPC ......... *H04N 19/129* (2014.11); *H04N 19/137* (2014.11); *H04N 19/139* (2014.11); *H04N 19/176* (2014.11); *H04N 19/184* (2014.11); *H04N 19/196* (2014.11); *H04N 19/46* (2014.11); *H04N 19/70* (2014.11)

(56) References Cited

U.S. PATENT DOCUMENTS

| | | | |
|---|---|---|---|
| 9,961,372 B2 | 5/2018 | He | |
| 10,448,010 B2 | 10/2019 | Chen et al. | |
| 10,462,462 B2 | 10/2019 | Chien et al. | |
| 10,560,712 B2 | 2/2020 | Zou et al. | |
| 10,757,417 B2 | 8/2020 | Zhang et al. | |
| 10,778,999 B2 | 9/2020 | Li et al. | |
| 10,841,609 B1 | 11/2020 | Liu et al. | |
| 11,128,884 B2 * | 9/2021 | Liu | H04N 19/109 |
| 11,310,508 B2 * | 4/2022 | Liu | H04N 19/132 |
| 2007/0201562 A1 | 8/2007 | Ganesh et al. | |
| 2012/0134415 A1 | 5/2012 | Lin et al. | |
| 2015/0271524 A1 | 9/2015 | Zhang et al. | |
| 2015/0382009 A1 | 12/2015 | Chen et al. | |
| 2017/0034529 A1 | 2/2017 | Lin et al. | |
| 2017/0105003 A1 | 4/2017 | Lainema et al. | |
| 2017/0332095 A1 | 11/2017 | Zou et al. | |
| 2017/0339425 A1 | 11/2017 | Jeong et al. | |
| 2018/0098089 A1 | 4/2018 | Chen et al. | |
| 2018/0270500 A1 | 9/2018 | Li et al. | |
| 2019/0387250 A1 | 12/2019 | Boyce et al. | |
| 2020/0021814 A1 | 1/2020 | Xu et al. | |
| 2020/0029091 A1 | 1/2020 | Chien et al. | |
| 2020/0045310 A1 | 2/2020 | Chen et al. | |
| 2020/0077113 A1 * | 3/2020 | Huang | H04N 19/55 |
| 2020/0107043 A1 | 4/2020 | Hung et al. | |
| 2020/0112727 A1 | 4/2020 | Xu et al. | |
| 2020/0145688 A1 | 5/2020 | Zou et al. | |
| 2020/0154101 A1 | 5/2020 | Li et al. | |
| 2020/0213594 A1 | 7/2020 | Liu et al. | |
| 2020/0213612 A1 | 7/2020 | Liu et al. | |
| 2020/0221117 A1 | 7/2020 | Liu et al. | |
| 2020/0359029 A1 | 11/2020 | Liu et al. | |
| 2020/0359045 A1 * | 11/2020 | Liu | H04N 19/52 |
| 2020/0382771 A1 | 12/2020 | Liu et al. | |
| 2020/0382795 A1 | 12/2020 | Zhang et al. | |
| 2020/0396453 A1 | 12/2020 | Zhang et al. | |
| 2020/0396465 A1 | 12/2020 | Zhang et al. | |
| 2021/0029362 A1 | 1/2021 | Liu et al. | |
| 2021/0152845 A1 | 5/2021 | Liu et al. | |
| 2021/0203945 A1 | 7/2021 | Liu et al. | |
| 2021/0289216 A1 * | 9/2021 | Liu | H04N 19/176 |
| 2021/0306659 A1 * | 9/2021 | Lai | H04N 19/46 |

FOREIGN PATENT DOCUMENTS

| | | |
|---|---|---|
| CN | 101005620 A | 7/2007 |
| CN | 101883286 A | 11/2010 |
| CN | 102509083 A | 6/2012 |
| CN | 102783149 A | 11/2012 |
| CN | 103583044 A | 2/2014 |
| CN | 103916673 A | 7/2014 |
| CN | 104919804 A | 9/2015 |
| CN | 105874789 A | 8/2016 |
| CN | 105900420 A | 8/2016 |
| CN | 105900425 A | 8/2016 |
| CN | 106331703 A | 1/2017 |
| CN | 106559669 A | 4/2017 |
| CN | 107787582 A | 3/2018 |
| CN | 107925775 A | 4/2018 |
| CN | 108605137 A | 9/2018 |
| CN | 108632616 A | 10/2018 |
| CN | 108702509 A | 10/2018 |
| CN | 108781284 A | 11/2018 |
| CN | 108965871 A | 12/2018 |
| EP | 0527011 B1 | 5/1999 |
| EP | 3273692 A1 | 1/2018 |
| EP | 3301918 A1 | 4/2018 |
| EP | 3860123 A1 | 8/2021 |
| WO | 2012103750 A1 | 8/2012 |
| WO | 2012120863 A1 | 9/2012 |
| WO | 2017118409 A1 | 7/2017 |
| WO | 2017144017 A1 | 8/2017 |
| WO | 2017147765 A1 | 9/2017 |
| WO | 2017164297 A1 | 9/2017 |
| WO | 2018039596 A1 | 3/2018 |
| WO | 2018047668 A1 | 3/2018 |
| WO | 2018067729 A1 | 4/2018 |
| WO | 2018128380 A1 | 7/2018 |
| WO | 2020024966 A1 | 2/2020 |
| WO | 2020069329 A1 | 4/2020 |
| WO | 2020130520 A1 | 6/2020 |

OTHER PUBLICATIONS

Bross et al. "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Jul. 10-18, 2018, document JVET-K1001, 2018.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
Chen et al. "CE4: Common Base for Affine Merge Mode (Test 4.2.1," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0366, 2018.
https://vcgit.hhi.fraunhofer.de/jvet/VVCSoftware_VTM/tags/VTM-2.1.
JEM-7.0: https://jvet.hhi.fraunhofer.de/svn/svn_HMJEMSoftware/tags/HM-16.6-JEM-7.0.
Han et al. "CE4.1.3: Affine Motion Compensation Prediction," Joint Video Exploration Team (JVET) of ITU-T SG 16 WP 3 and ISO/IEC JTC 1/SC 29/WG 11, 11th meeting, Ljubljana, SI, Jul. 10-18, 2018, document JVET-K0337, 2018.
"Information Technology—High Efficiency Coding and Media Delivery in Heterogeneous Environments—Part 2: High Efficiency Video Coding" Apr. 20, 2018, ISO/DIS 23008, 4th Edition.
Jeong et al. "CE4 Ultimate Motion Vector Expression in J0024 (Test 4.2.9)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0115, 2018.

(56) References Cited

OTHER PUBLICATIONS

Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.

Li et al. "An Efficient Four-Parameter Affine Motion Model for Video Coding," IEEE Transactions on Circuits and Systems for Video Technology, Aug. 2018, 28(8):1934-1948.

Li et al. "CE4-Related: Affine Merge Mode with Prediction Offsets," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0320, 2018.

Liao et al. "CE10.3.1.b: Triangular Prediction Unit Mode," Joint Video Exploration Team (JVET) of ITU-T SG 16 WP 3 and ISO/IEC JTC 1/SC 29/WG 11, 12th Meeting: Macao, CN, Oct. 3-12, 2018, document JVET-L0124, 2018.

Su et al. "CE4.4.1: Generalized Bi-Prediction for Intercoding," Joint Video Exploration Team of ISO/IEC JTC 1/SC 29/WG 11 and ITU-T SG 16, Ljubljana, Jul. 11-18, 2018, document No. JVET-K0248, 2018.

Xu et al. "CE8-2.2: Current Picture Referencing Using Reference Index Signaling," Joint Video Experts Team (JVET) of ITU-T SG 16 WP 3 and ISO/IEC JTC 1/SC 29/WG 11, 11th Meeting, Ljubljana, SI, Jul. 10-18, 2018, document, JVET-K0076, 2018.

Yang et al. "Description of Core Experiment 4 (CE4): Inter Prediction and Motion Vector Coding," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1024, 2018.

International Search Report and Written Opinion from International Patent Application No. PCT/CN2019/119197 dated Feb. 18, 2020 (9 pages).

International Search Report and Written Opinion from International Patent Application No. PCT/CN2019/119206 dated Feb. 28, 2020 (9 pages).

International Search Report and Written Opinion from International Patent Application No. PCT/CN2019/119210 dated Feb. 21, 2020 (9 pages).

International Search Report and Written Opinion from International Patent Application No. PCT/CN2019/119214 dated Jan. 23, 2020 (10 pages).

International Search Report and Written Opinion from International Patent Application No. PCT/CN2019/119217 dated Feb. 12, 2020 (11 pages).

International Search Report and Written Opinion from International Patent Application No. PCT/CN2019/126990 dated Mar. 24, 2020 (13 pages).

International Search Report and Written Opinion (Corrected) from International Patent Application No. PCT/CN2019/126990 dated Mar. 18, 2021 (10 pages).

International Search Report and Written Opinion from International Patent Application No. PCT/CN2019/127001 dated Mar. 19, 2020 (9 pages).

Notice of Allowance from U.S. Appl. No. 17/154,565 dated Mar. 31, 2021.

Non-Final Office Action from U.S. Appl. No. 17/203,604 dated Jun. 17, 2021.

Jeong et al. "Proposed WD for CE4 Ultimate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054_WD, 2018.

Liu et al. "AHG11: MMVD without Fractional Distances for SCC," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0255, 2019.

Yang et al. "CE4 Summary Report: Inter Prediction and Motion Vector Coding," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0024, 2018.

Extended European Search Report from European Patent Application No. 19897900.7 dated Nov. 11, 2021 (11 pages).

Notice of Allowance from U.S. Appl. No. 17/203,604 dated Feb. 3, 2022.

Bross et al. "Versatile Video Coding (Draft 3)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L1001, 2018. (cited in JP2021-532854 OA1 mailed May 31, 2022).

Zhang et al. "CE4.3.3: Locally Adaptive Motion Vector Resolution and MVD Coding," Joint Video Exploration Team (JVET) of ITU-T SG 16 WP 3 and ISO/IEC JTC 1/SC 29/WG 11 11th Meeting, Ljubljana, SI, Jul. 10-18, 2018, document JVET-K0357, 2018. (cited in JP2021-532854 OA1 mailed May 31, 2022).

* cited by examiner

1530 →

1532 — Determining, during a conversion between a current video block of a video and a coded representation of the video, to perform refinement of a motion vector difference (MVD) value for the current video block upon determining that the current video block uses an ultimate motion vector expression (UMVE) coding tool that represents a motion vector expression that includes a starting point, a motion magnitude and a motion direction for the current video block 1534 — Performing the conversion according to the rule

1542 — Determining, for a conversion between a current video block of a video and a coded representation of the video, to use a first ultimate motion vector expression (UMVE) parameter set from multiple UMVE parameter sets upon determining that the current video block uses an UMVE coding tool that represents a motion vector expression that includes a starting point, a motion magnitude and a motion direction for the current video block 1544 — Performing the conversion according to the rule

FIG. 15D

CONSTRUCTION OF AFFINE CANDIDATES IN VIDEO PROCESSING

CROSS REFERENCE TO RELATED APPLICATIONS

This application is a continuation of International Application No. PCT/CN2019/119210, filed on Nov. 18, 2019, which claims the priority to and benefits of International Patent Application No. PCT/CN2018/116067, filed on Nov. 17, 2018, International Patent Application No. PCT/CN2018/122626, filed on Dec. 21, 2018, International Patent Application No. PCT/CN2018/125417, filed on Dec. 29, 2018 and International Patent Application No. PCT/CN2019/072814, filed on Jan. 23, 2019. For all purposes under the U.S. law, the entire disclosures of the aforementioned applications are incorporated by reference as part of the disclosure of this application.

TECHNICAL FIELD

The present document relates to video and image coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses video coding tools that, in one example aspect, improve coding efficiency of current coding tools related to ultimate motion vector expression or generalized bi-prediction.

In one example aspect, a method of video processing is disclosed. The method includes determining, for a conversion between a current video block of a video and a coded representation of the video, a mode of operation of an ultimate motion vector expression (UMVE) mode; and performing the conversion based on the determining, wherein the current video block is coded with a merge mode and motion vector differences in an UMVE mode that comprises a motion vector expression that includes a starting point of motion information, a motion magnitude and a motion direction for the current video block, and wherein one or more fields in the coded representation correspond to the mode of operation, and wherein the one or more fields include: an UMVE enable field whose value indicates whether the UMVE mode is enabled or disabled for the current video block, or a modified affine mode enable field that indicates whether an affine merge mode modified based on the UMVE mode is enabled or disabled for the current video block.

In another example aspect, a method of video processing is disclosed. The method includes determining, for a conversion between a current video block of a video and a coded representation of the video, a mode of operation of an ultimate motion vector expression (UMVE) mode; and performing the conversion based on the determining, wherein the current video block is coded with a merge mode and motion vector differences in an UMVE mode that comprises a motion vector expression that includes a starting point of motion information, a motion magnitude and a motion direction for the current video block, and wherein one or more fields in the coded representation correspond to the mode of operation, and wherein the one or more fields include: a list size field that indicates a size of a base candidate list used by the UMVE mode, or a table field that signals a distance table or a direction table for the UMVE mode.

In another example aspect, a method of video processing is disclosed. The method includes performing a conversion between a current video block of a video and a coded representation of the video using an ultimate motion vector expression (UMVE) coding tool, wherein the UMVE coding tool represents a motion vector expression that includes a starting point of motion information, a motion magnitude and a motion direction for the current video block, and wherein at least one of a distance table or a direction table depends on a picture order count (POC) of two reference pictures or a POC of a current picture that includes the current video block, or a quantization parameter (QP) used for coding the current video block, a current slice, or the current picture.

In another example aspect, a method of video processing is disclosed. The method includes determining, for a conversion between a current video block of a video and a coded representation of the video, a mode of operation of an affine ultimate motion vector expression (UMVE) mode; and performing the conversion based on the determining, wherein the current video block is coded with an affine merge mode and motion vector differences in the affine UMVE mode that includes a starting point of motion information, a motion magnitude and a motion direction for the current video block, and wherein one or more fields in the coded representation correspond to the mode of operation, and wherein the one or more fields include: a list size field that indicates a size of a base affine merge candidate list for an affine merge mode with prediction offsets that is used by the UMVE mode, or a table field that signals a distance table or a direction table for the affine merge mode with prediction offset.

In another example aspect, a method of video processing is disclosed. The method includes determining to signal multiple motion vector differences in an ultimate motion vector expression (UMVE) coding tool for a conversion between a current video block of a video and a coded representation of the video; and performing the conversion based on the determining, wherein, using the UMVE coding tool, a motion vector expression that includes a starting point, N motion vector differences represented by N motion magnitudes and N motion directions of the current video block is used during the conversion, N being an integer equal to or greater than two.

In another example aspect, a method of video processing is disclosed. The method includes determining, for a conversion between a current video block of a video and a coded representation of the video, that a rule is applicable to the conversion due to the current video block using a current picture referencing (CPR) coding tool and an ultimate motion vector expression (UMVE) coding tool; and performing the conversion according to the rule, wherein the rule disallows use of one or more coding distances for the conversion, wherein the CPR coding tool uses a current picture as a reference picture, and wherein the UMVE coding tool uses a motion vector expression that includes a starting point, a motion magnitude and a motion direction for the current video block.

In another example aspect, a method of video processing is disclosed. The method includes determining, during a conversion between a current video block of a video and a coded representation of the video, to perform refinement of a motion vector difference (MVD) value for the current video block upon determining that the current video block uses an ultimate motion vector expression (UMVE) coding tool that represents a motion vector expression that includes a starting point, a motion magnitude and a motion direction for the current video block; and performing the conversion based on the determining.

In another example aspect, a method of video processing is disclosed. The method includes determining, for a conversion between a current video block of a video and a coded representation of the video, to use a first ultimate motion vector expression (UMVE) parameter set from multiple UMVE parameter sets upon determining that the current video block uses an UMVE coding tool that represents a motion vector expression that includes a starting point, a motion magnitude and a motion direction for the current video block; and performing the conversion based on the determining, wherein an indication of at least one of the multiple UMVE parameter sets is signaled or predefined for the current video block.

In another example aspect, a method of video processing is disclosed. The method includes selecting a UMVE parameter set for a conversion between a current video block of a video and a coded representation of the video, upon determining that the current video block uses an ultimate motion vector expression (UMVE) coding tool that represents a motion vector expression that includes a starting point, a motion magnitude and a motion direction for the current video block, wherein the selected UMVE parameter set is changed across different video blocks, different reference picture lists, different reference pictures, different tiles, different slices, different pictures, or different temporal layers.

In another example aspect, a method of video processing is disclosed. The method includes performing a conversion between a current video block of a video and a coded representation of the video using an ultimate motion vector expression (UMVE) coding tool that represents a motion vector expression that includes a starting point, a motion magnitude and a motion direction for the current video block, wherein an adaptive motion vector resolution (AMVR) scheme is used to signal distance tables used by the UMVE coding tool.

In another example aspect, a method of video processing is disclosed. The method includes determining, for a conversion between a current video block of a video and a coded representation of the video, a mode of operation of a generalized bi-prediction (GBi) coding tool in which a prediction of the current video block uses a final predictor corresponding to a non-uniformly weighted sum of predictors from two reference lists; and performing the conversion based on the determining, wherein a field in the coded representation corresponds to the mode of operation and a value of the field indicates whether the GBI coding tool is enabled or disabled for the current video block.

In another example aspect, a method of video processing is disclosed. The method includes performing a conversion between a current video block of a video and a coded representation of the video, based on a rule that controls a parameter of a GBi coding tool in which a prediction of the current video block uses a final predictor corresponding to a non-uniformly weighted sum of predictors from two reference lists, wherein the rule specifies that a weighting factor set used by the GBi coding tool is based on i) a temporal layer of a picture including the current video block, ii) a picture quantization parameter of the picture, or iii) a quantization parameter of the current video block.

In another example aspect, a method of video processing is disclosed. The method includes determining, for a conversion between a current video block of a video and a coded representation of the video, to use a weight that is unequal to one for an uni-prediction mode; and performing the conversion based on the determining, wherein a prediction of the current video block uses a final predictor corresponding to predictors scaled by the weight, and wherein a weighting factor set is selected at a block level or a coding unit level.

In another example aspect, a method of video processing is disclosed. The method includes performing a conversion between a current video block of a video and a coded representation of the video, based on a rule that controls a parameter of a GBi coding tool in which a prediction of the current video block uses a final predictor corresponding to a non-uniformly weighted sum of predictors from two reference lists, wherein the rule specifies to select or derive a weighting factor for the GBi coding tool based on neighboring pixels of the current video block and corresponding reference neighboring pixels identified by motion vectors or integer part of the motion vectors of the current video block.

In another example aspect, a method of video processing is disclosed. The method includes performing a conversion between a current video block of a video and a coded representation of the video, based on a rule that controls a parameter of a GBi coding tool in which a prediction of the current video block uses a final predictor corresponding to a non-uniformly weighted sum of predictors from two reference lists, wherein the rule specifies to reorder weighting factors for the GBi coding tool based on neighboring pixels of the current video block and corresponding reference neighboring pixels identified by motion vectors or integer part of the motion vectors of the current video block.

In another example aspect, a method of video processing is disclosed. The method includes performing a conversion between a current video block of a video and a coded representation of the video, based on a rule that controls a parameter of a GBi coding tool in which a prediction of the current video block uses a final predictor corresponding to a non-uniformly weighted sum of predictors from two reference lists, wherein a rule specifies to use local illumination compensation (LIC) parameters associated with the current video block for determining a weighting factor for the GBi coding tool, and wherein the LIC parameters are derived to use a linear model of illumination changes in the current block during the conversion.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In another example aspect, the above-described method may be implemented by a video encoder apparatus or a video decoder apparatus that comprises a processor.

These, and other, aspects are further described in the present document.

BRIEF DESCRIPTION OF DRAWINGS

FIGS. 15A-15E show flowcharts for example methods of video processing based on some implementations of the disclosed technology.

DETAILED DESCRIPTION

The present document provides various techniques that can be used by a decoder of video bitstreams to improve the quality of decompressed or decoded digital video. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This patent document is related to video coding technologies. Specifically, it is related to motion compensation in video coding. It may be applied to the existing video coding standard like HEVC, or the standard (Versatile Video Coding) to be finalized. It may be also applicable to future video coding standards or video codec.

2. Introductory comments

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 2) could be found at:

http://phenix.it-sudparis.eu/jvet/doc_end_user/documents/11_Ljubljana/wg11/JVET-K1001-v7.zip The latest reference software of VVC, named VTM, could be found at:

https://vcgit.hhi.fraunhofer.de/jvet/VVCSoftware_VTM/tags/VTM-2.1

2.1 Affine motion compensation prediction

Figure 1:
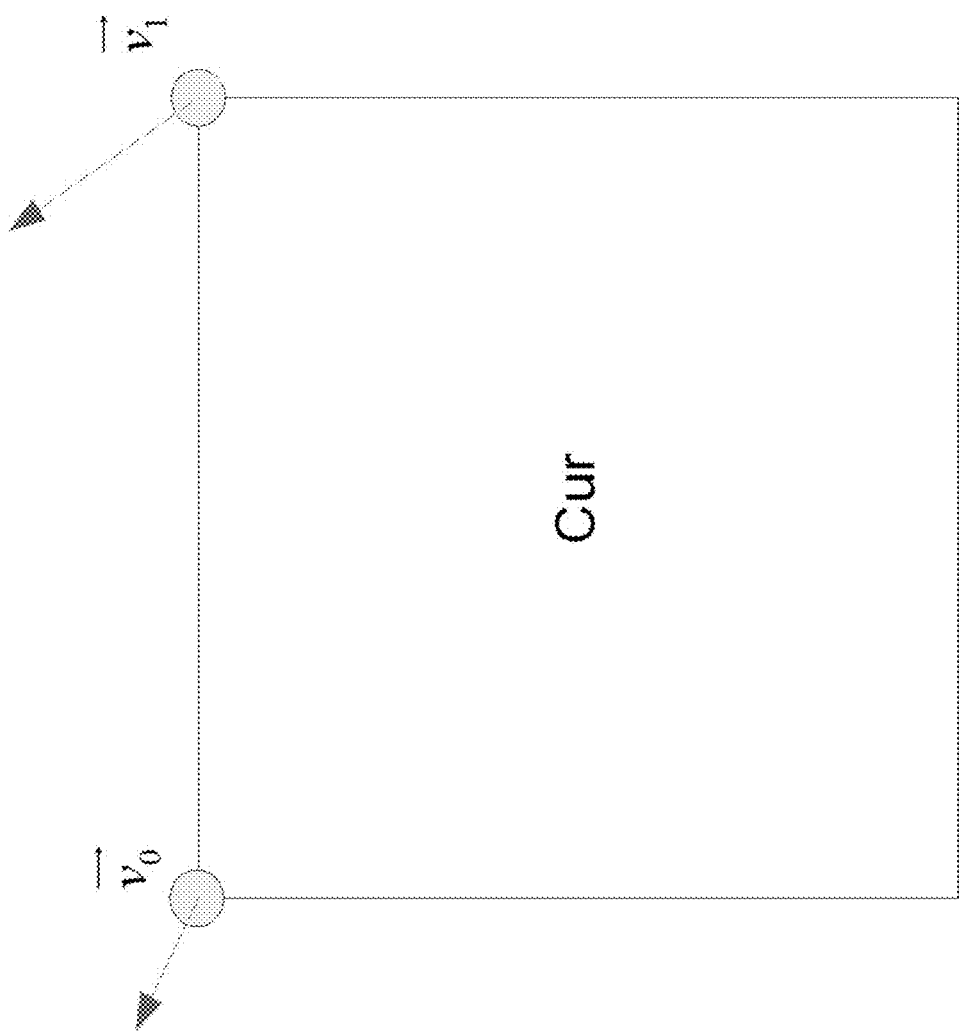
FIG. 1 shows an example of simplified affine motion model.

In HEVC, only translation motion model is applied for motion compensation prediction (MCP). While in the real world, there are many kinds of motion, e.g. zoom in/out, rotation, perspective motions and he other irregular motions. In the JEM, a simplified affine transform motion compensation prediction is applied. As shown FIG. 1, the affine motion field of the block is described by two control point motion vectors.

The motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (1)$$

Where $(v_{0x}, v_{0y})$ is motion vector of the top-left corner control point, and $(v_{1x}, v_{1y})$ is motion vector of the top-right corner control point.

In order to further simplify the motion compensation prediction, sub-block based affine transform prediction is applied. The sub-block size M×N is derived as in Equation 2, where MvPre is the motion vector fraction accuracy (1/16 in JEM), $(v_{2x}, v_{2y})$ is motion vector of the bottom-left control point, calculated according to Equation 1.

$$\begin{cases} M = \text{clip }3\left(4, w, \frac{w \times MvPre}{\max(abs(v_{1x} - v_{0x}), abs(v_{1y} - v_{0y}))}\right) \\ N = \text{clip }3\left(4, h, \frac{h \times MvPre}{\max(abs(v_{2x} - v_{0x}), abs(v_{2y} - v_{0y}))}\right) \end{cases} \quad (2)$$

After derived by Equation 2, M and N should be adjusted downward if necessary to make it a divisor of w and h, respectively.

Figure 2:
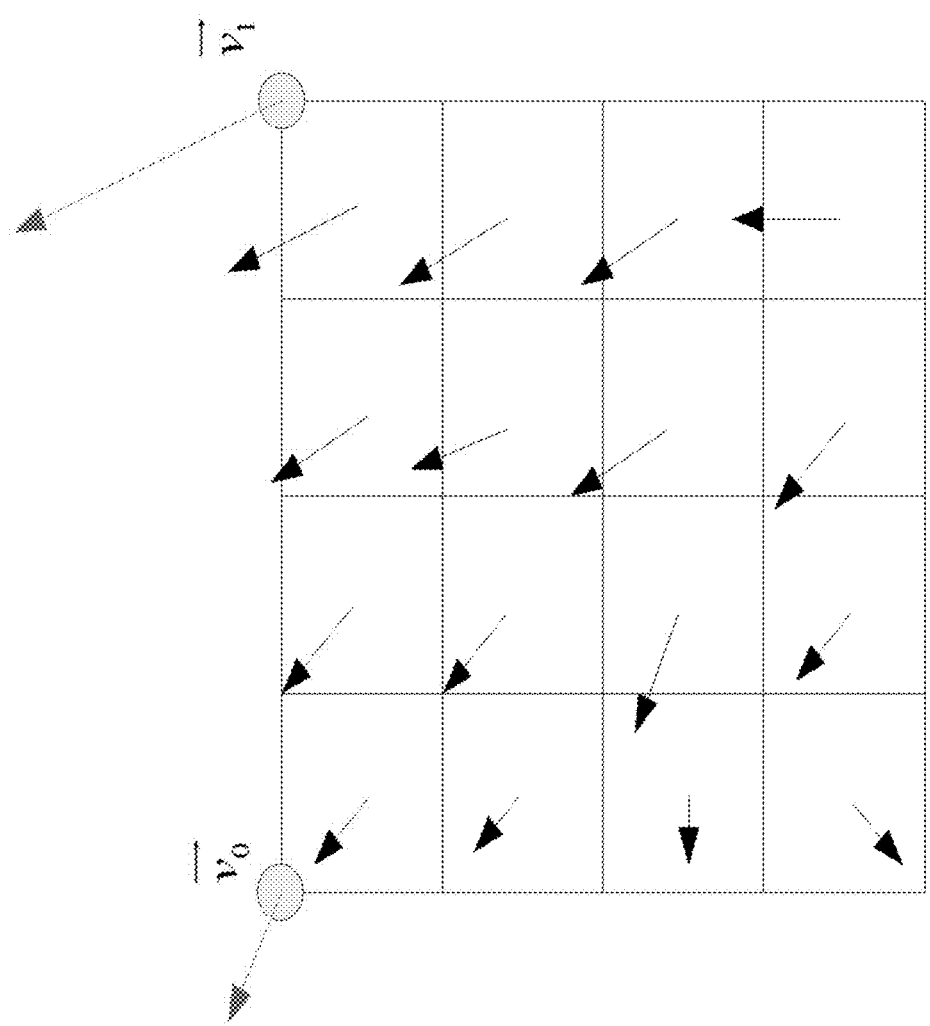
FIG. 2 shows an example of affine motion vector field (MVF) per sub-block.

To derive motion vector of each M×N sub-block, the motion vector of the center sample of each sub-block, as shown in FIG. 2, is calculated according to Equation 1, and rounded to 1/16 fraction accuracy.

After MCP, the high accuracy motion vector of each sub-block is rounded and saved as the same accuracy as the normal motion vector.

2.1.1 AF_INTER mode

Figure 4:
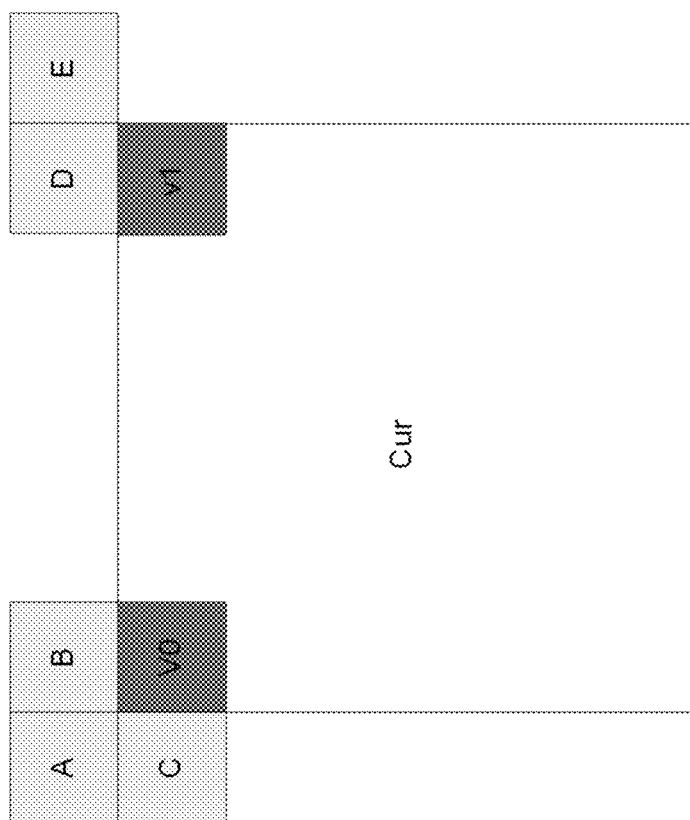
FIG. 4 shows an example of motion vector predictor (MVP) for AF_INTER.

In the JEM, there are two affine motion modes: AF_INTER mode and AF_MERGE mode. For CUs with both width and height larger than 8, AF_INTER mode can be applied. An affine flag in CU level is signalled in the bitstream to indicate whether AF_INTER mode is used. In this mode, a candidate list with motion vector pair $\{(v_0, v_1)|v_0=\{v_A, v_B, v_C\}, v_1=\{v_D, v_E\}\}$ is constructed using the neighbour blocks. As shown in FIG. 4, $v_0$ is selected from the motion vectors of the block A, B or C. The motion vector from the neighbour block is scaled according to the reference list and the relationship among the POC of the reference for the neighbour block, the POC of the reference for the current CU and the POC of the current CU. And the approach to select $v_1$ from the neighbour block D and E is similar. If the number of candidate list is smaller than 2, the list is padded by the motion vector pair composed by duplicating each of the AMVP candidates. When the candidate list is larger than 2, the candidates are firstly sorted according to the consistency of the neighbouring motion vectors (similarity of the two motion vectors in a pair candidate) and only the first two candidates are kept. An RD cost check is used to determine which motion vector pair candidate is selected as the control point motion vector prediction (CPMVP) of the current CU. And an index indicating the position of the CPMVP in the candidate list is signalled in the bitstream. After the CPMVP of the current affine CU is determined, affine motion estimation is applied and the control point motion vector (CPMV) is found. Then the difference of the CPMV and the CPMVP is signalled in the bitstream.

Figure 3B:
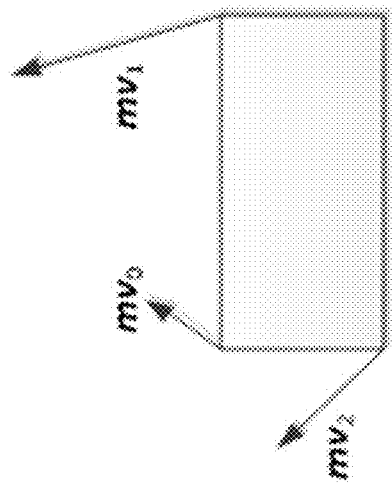
FIGS. 3A-3B show 4 and 6 parameter affine models, respectively.
Figure 3A:
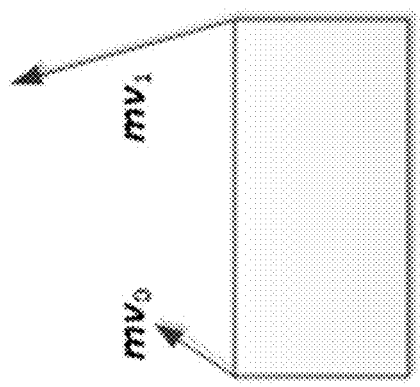

FIG. 3A shows an example of a 4-paramenter affine model. FIG. 3B shows an example of a 6-parameter affine model.

In AF_INTER mode, when 4/6 parameter affine mode is used, 2/3 control points are required, and therefore 2/3 MVD needs to be coded for these control points, as shown in FIGS. 3A and 3B. In JVET-K0337, it is proposed to derive the MV as follows, i.e., $mvd_1$ and $mvd_2$ are predicted from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Wherein $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 3B. Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.1.2 Fast affine ME algorithm in AF_INTER mode

In affine mode, MV of 2 or 3 control points needs to be determined jointly. Directly searching the multiple MVs jointly is computationally complex. A fast affine ME algorithm is proposed and is adopted into VTM/BMS.

The fast affine ME algorithm is described for the 4-parameter affine model, and the idea can be extended to 6-parameter affine model.

$$\begin{cases} x' = ax + by + c \\ y' = -bx + ay + d \end{cases} \quad (3)$$

$$\begin{cases} mv^h_{(x,y)} = x' - x = (a-1)x + by + c \\ mv^v_{(x,y)} = y' - y = -bx + (a-1)y + d \end{cases} \quad (4)$$

Replace (a−1) with a', then the motion vector can be rewritten as:

$$\begin{cases} mv^h_{(x,y)} = x' - x = a'x + by + c \\ mv^v_{(x,y)} = y' - y = -bx + a'y + d \end{cases} \quad (5)$$

Suppose motion vectors of the two controls points (0, 0) and (0, w) are known, from Equation (5) we can derive affine parameters, $$\begin{cases} c = mv^h_{(0,0)} \\ d = mv^v_{(0,0)} \end{cases} \quad (6)$$

The motion vectors can be rewritten in vector form as:

$$MV(p) = A(P) * MV_C^T \quad (7)$$

Wherein $$A(P) = \begin{bmatrix} 1 & x & 0 & y \\ 0 & y & 1 & -x \end{bmatrix} \quad (8)$$

$$MV_C = \begin{bmatrix} mv^h_{(0,0)} & a & mv^v_{(0,0)} & b \end{bmatrix} \quad (9)$$

P=(x, y) is the pixel position.

At encoder, MVD of AF_INTER are derived iteratively. Denote $MV^i(P)$ as the MV derived in the ith iteration for position P and denote $dMV_C^i$ as the delta updated for $MV_C$ in the ith iteration. Then in the (i+1)th iteration, $$MV^{i+1}(P) = A(P)*((MV_C^i)^T + (dMV_C^i)^T)$$

$$= A(P)*(MV_C^i)^T + A(P)*(dMV_C^i)^T$$

$$= MV^i(P) + A(P)*(dMV_C^i)^T \quad (10)$$

Denote $Pic_{ref}$ as the reference picture and denote $Pic_{cur}$ as the current picture and denote $Q = P + MV^i(P)$. Suppose we use MSE as the matching criterion, then we need to minimize:

$$\min \sum_P (Pic_{cur}(P) - Pic_{ref}(P + MV^{i+1}(P)))^2 = \quad (11)$$

$$\min \sum_P (Pic_{cur}(P) - Pic_{ref}(Q + A(P)*(dMV_C^i)^T))^2$$

Suppose $(dMV_C^i)^T$ is small enough, we can rewrite $Pic_{ref}(Q+A(P)*(dMV_C^i)^T)$ approximately as follows with 1th order Taylor expansion.

$$Pic_{ref}(Q+A(P)*(dMV_C^i)^T) \approx Pic_{ref}(Q) + Pic'_{ref}(Q)*A(P)*(dMV_C^i)^T \quad (12)$$

Where $$Pic'_{ref}(Q) = \begin{bmatrix} \frac{dPic_{ref}(Q)}{dx} & \frac{\partial Pic_{ref}(Q)}{dy} \end{bmatrix} \cdot \text{Denote } E^{i+1}(P) = \quad (13)$$

$$Pic_{cur}(P) - Pic_{ref}(Q),$$

$$\min \sum_P (Pic_{cur}(P) - Pic_{ref}(Q) - Pic'_{ref}(Q)*A(P)*(dMV_C^i)^T)^2$$

$$= \min \sum_P (E^{i+1}(P) - Pic'_{ref}(Q)*A(P)*(dMV_C^i)^T)^2$$

we can derive $dMV_C^i$ by setting the derivative of the error function to zero. Then can then calculate delta MV of the control points (0, 0) and (0, w) according to $A(P)*(dMV_C^i)^T$, $$dMV_{(0,0)}{}^h = dMV_C^i[0] \quad (14)$$

$$dMV_{(0,w)}{}^h = dMV_C^i[1]*w + dMV_C^i[2] \quad (15)$$

$$dMV_{(0,0)}{}^v = dMV_C^i[2] \quad (16)$$

$$dMV_{(0,w)}{}^v = -dMV_C^i[3]*w + dMV_C^i[2] \quad (17)$$

Suppose such MVD derivation process is iterated by n times, then the final MVD is calculated as follows, $$\int dMV_{(0,0)}{}^h = \Sigma_{i=0}^{n-1} dMV_C^i[0] \quad (18)$$

$$\int dMV_{(0,w)}{}^h = \Sigma_{i=0}^{n-1} dMV_C^i[1]*w + \Sigma_{i=0}^{n-1} dMV_C^i[0] \quad (19)$$

$$\int dMV_{(0,0)}{}^h = \Sigma_{i=0}^{n-1} dMV_C^i[0] \quad (20)$$

$$\int dMV_{(0,w)}{}^h = \Sigma_{i=0}^{n-1} - dMV_C^i[3]*w + \Sigma_{i=0}^{n-1} dMV_C^i[2] \quad (21)$$

With JVET-K0337, i.e., predicting delta MV of control point (0, w), denoted by $mvd_1$ from delta MV of control point (0, 0), denoted by $mvd_0$, now actually only $(\Sigma_{i=0}^{n-1} dMV_C^i[1]*w, -\Sigma_{i=0}^{n-1} -dMV_C^i[3]*w)$ is encoded for $mvd_1$.

2.1.3 AF_MERGE mode

Figures 5A, 5B:
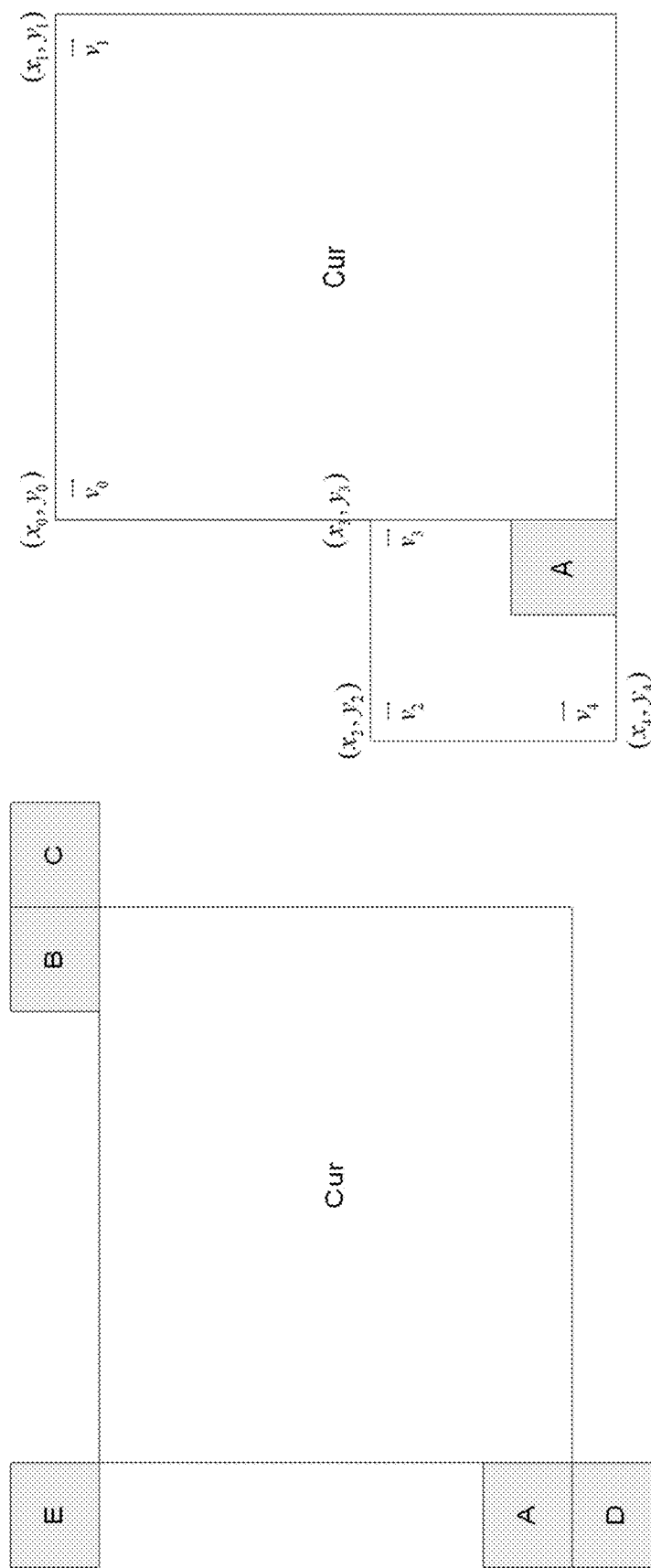
FIGS. 5A-5B show examples of candidates for AF_MERGE.

When a CU is applied in AF_MERGE mode, it gets the first block coded with affine mode from the valid neighbour reconstructed blocks. And the selection order for the candidate block is from left, above, above right, left bottom to above left as shown in FIG. 5A. If the neighbour left bottom block A is coded in affine mode as shown in FIG. 5B, the motion vectors $v_2$, $v_3$ and $v_4$ of the top left corner, above right corner and left bottom corner of the CU which contains the block A are derived. And the motion vector $v_0$ of the top left corner on the current CU is calculated according to $v_2$, $v_3$ and $v_4$. Secondly, the motion vector $v_1$ of the above right of the current CU is calculated.

After the CPMV of the current CU $v_0$ and $v_1$ are derived, according to the simplified affine motion model Equation 1, the MVF of the current CU is generated. In order to identify whether the current CU is coded with AF_MERGE mode, an affine flag is signalled in the bitstream when there is at least one neighbour block is coded in affine mode.

In JVET-L0366, which was planned to be adopted into VTM 3.0, an affine merge candidate list is constructed with following steps:

1) Insert inherited affine candidates

Figure 6:
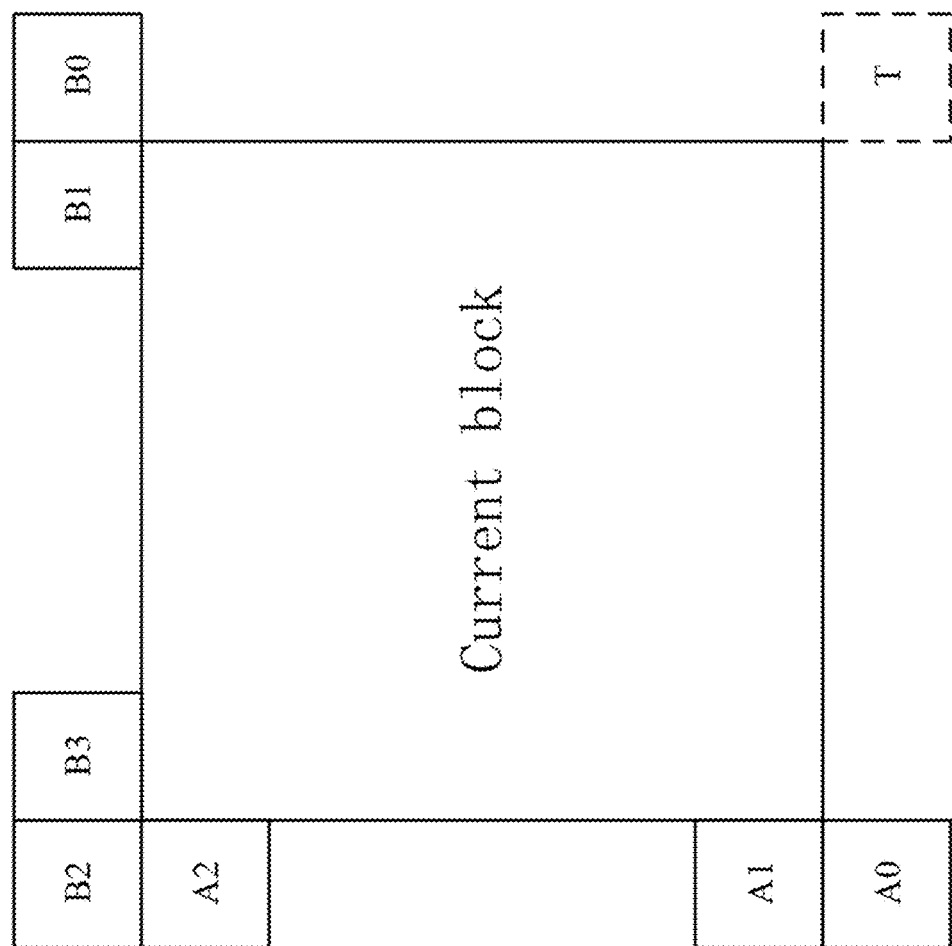
FIG. 6 shows an example of candidate positions for affine merge mode.

Inherited affine candidate means that the candidate is derived from the affine motion model of its valid neighbor affine coded block. In the common base, as shown in FIG. 6, the scan order for the candidate positions is: A1, B1, B0, A0 and B2.

After a candidate is derived, full pruning process is performed to check whether same candidate has been inserted into the list. If a same candidate exists, the derived candidate is discarded.

2) Insert constructed affine candidates

If the number of candidates in affine merge candidate list is less than MaxNumAffineCand (set to 5 in this contribution), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 6 CPk (k=1, 2, 3, 4) represents the k-th control point. A0, A1, A2, B0, B, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

FIG. 6 shows an example of candidates position for affine merge mode

The motion information of each control point is obtained according to the following priority order:

For CP1, the checking priority is B2->B3->A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1->B0.

For CP3, the checking priority is A1->A0.

For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.

The combinations of constructed affine candidates are inserted into to candidate list as following order: {CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived candidate is discarded.

3) Padding with zero motion vectors

If the number of candidates in affine merge candidate list is less than 5, zero motion vectors with zero reference indices are insert into the candidate list, until the list is full.

2.2 affine merge mode with prediction offsets

UMVE is extended to affine merge mode, we will call this UMVE affine mode thereafter. The proposed method selects the first available affine merge candidate as a base predictor. Then it applies a motion vector offset to each control point's motion vector value from the base predictor. If there's no affine merge candidate available, this proposed method will not be used.

The selected base predictor's inter prediction direction, and the reference index of each direction is used without change.

In the current implementation, the current block's affine model is assumed to be a 4-parameter model, only 2 control points need to be derived. Thus, only the first 2 control points of the base predictor will be used as control point predictors.

For each control point, a zero_MVD flag is used to indicate whether the control point of current block has the same MV value as the corresponding control point predictor. If zero_MVD flag is true, there's no other signaling needed for the control point. Otherwise, a distance index and an offset direction index is signaled for the control point.

Figure 7:
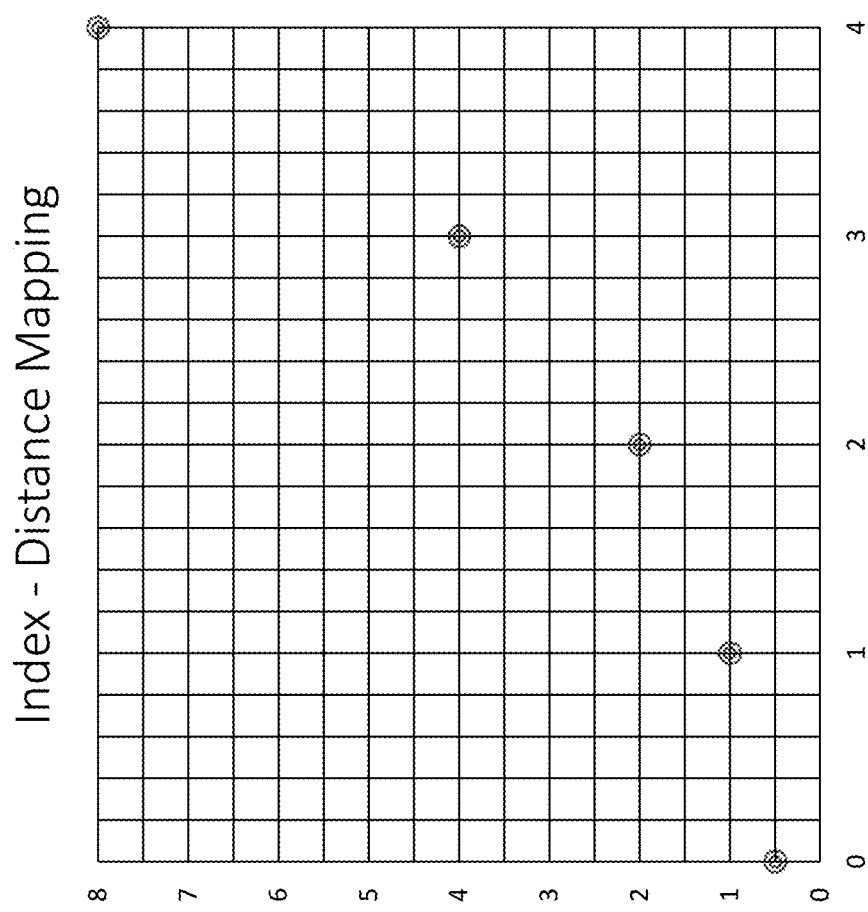
FIG. 7 shows an example of distance index and distance offset mapping.

A distance offset table with size of 5 is used as shown in the table below. Distance index is signaled to indicate which distance offset to use. The mapping of distance index and distance offset values is shown in FIG. 7.

TABLE 1

Distance offset table

| | Distance IDX | | | | |
|---|---|---|---|---|---|
| | 0 | 1 | 2 | 3 | 4 |
| Distance-offset | ½-pel | 1-pel | 2-pel | 4-pel | 8-pel |

The direction index can represent four directions as shown below, where only x or y direction may have an MV difference, but not in both directions.

TABLE 2

Directions Represented by Direction Index

| | Offset Direction IDX | | | |
|---|---|---|---|---|
| | 00 | 01 | 10 | 11 |
| x-dir-factor | +1 | −1 | 0 | 0 |
| y-dir-factor | 0 | 0 | +1 | −1 |

If the inter prediction is uni-directional, the signaled distance offset is applied on the offset direction for each control point predictor. Results will be the MV value of each control point.

For example, when base predictor is uni-directional, and the motion vector values of a control point is MVP $(v_{px}, v_{py})$. When distance offset and direction index are signaled, the motion vectors of current block's corresponding control points will be calculated as below.

$$MV(v_x, v_y) = MVP(v_{px}, v_{py}) + MV(\text{x-dir-factor}^* \text{distance-offset}, \text{y-dir-factor}^*\text{distance-offset});$$

If the inter prediction is bi-directional, the signaled distance offset is applied on the signaled offset direction for control point predictor's L0 motion vector; and the same distance offset with opposite direction is applied for control point predictor's L1 motion vector. Results will be the MV values of each control point, on each inter prediction direction.

For example, when base predictor is uni-directional, and the motion vector values of a control point on L0 is $MVP_{L0}$ $(v_{0px}, v_{0py})$, and the motion vector of that control point on L1 is $MVP_{L1}$ $(v_{1px}, v_{1py})$. When distance offset and direction index are signaled, the motion vectors of current block's corresponding control points will be calculated as below.

$$MV_{L0}(v_{0x}, v_{0y}) = MVP_{L0}(v_{0px}, v_{0py}) + MV(\text{x-dir-factor}^*\text{distance-offset}, \text{y-dir-factor}^*\text{distance-offset});$$

$$MV_{L1}(v_{0x}, v_{0y}) = MVP_{L1}(v_{0px}, v_{0py}) + MV(-\text{x-dir-factor}^*\text{distance-offset}, \text{y-dir-factor}^*\text{distance-offset});$$

2.3 Ultimate motion vector expression

Ultimate motion vector expression (UMVE) is presented. UMVE is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

Figure 8:
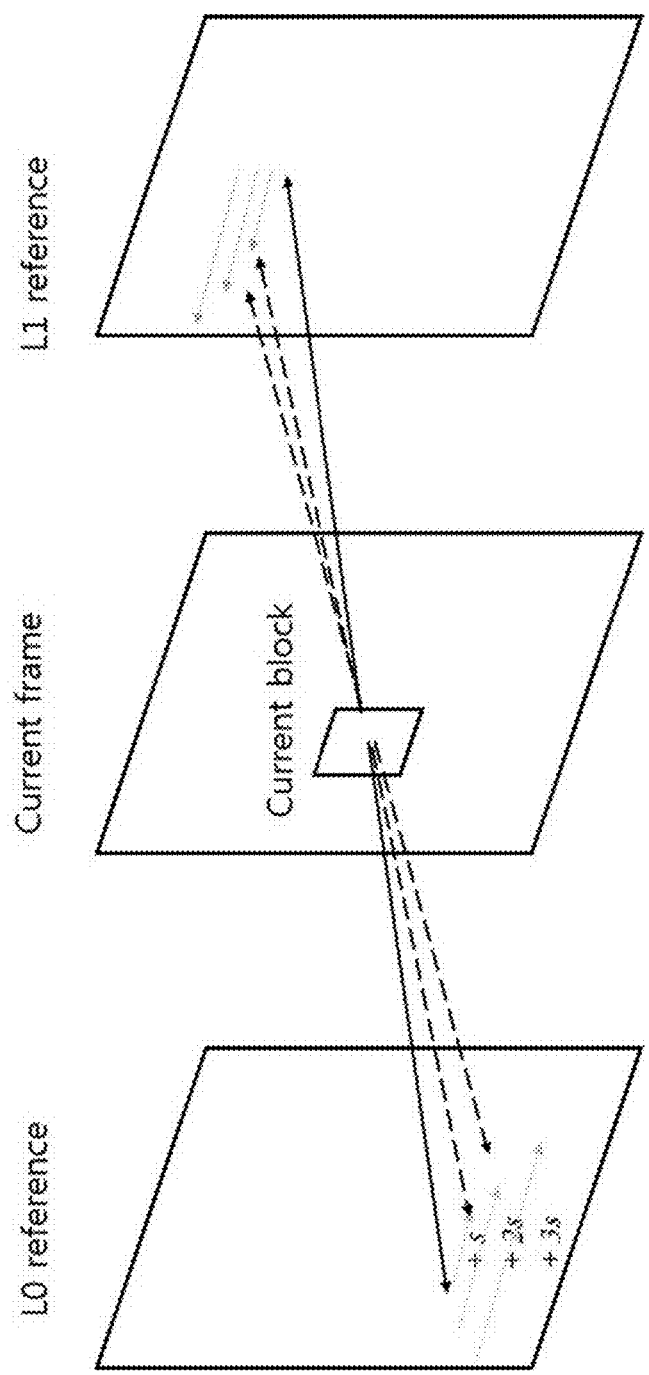
FIG. 8 shows an example of ultimate motion vector expression (UMVE) search process.

FIG. 8 shows an example of UMVE Search Process.

Figure 9:
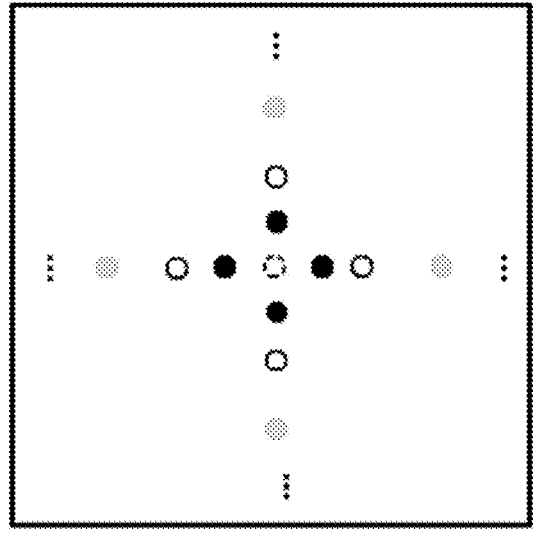
FIG. 9 shows an example of UMVE search point.
Figure 9:
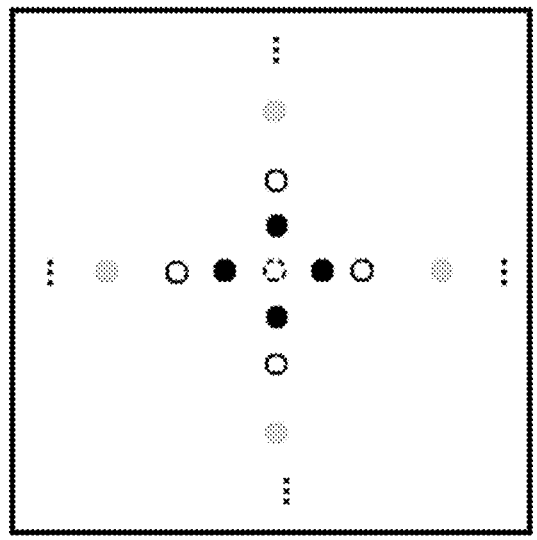

FIG. 9 shows examples of UMVE Search Points.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 3

Base candidate IDX

| | Base candidate IDX | | | |
|---|---|---|---|---|
| | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 4

Distance IDX

| | Distance IDX | | | | | | | |
|---|---|---|---|---|---|---|---|---|
| | 0 | 1 | 2 | 3 | 4 | 5 | 6 | 7 |
| Pixel distance | 1/4-pel | 1/2-pel | 1-pel | 2-pel | 4-pel | 8-pel | 16-pel | 32-pel |

Direction index represents the direction of the MVD relative to the starting point. The direction index can represent of the four directions as shown below.

TABLE 5

Direction IDX

| | Direction IDX | | | |
|---|---|---|---|---|
| | 00 | 01 | 10 | 11 |
| x-axis | + | − | N/A | N/A |
| y-axis | N/A | N/A | + | − |

UMVE flag is singnaled right after sending a skip flag or merge flag. If skip or merge flag is true, UMVE flag is parsed. If UMVE flage is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

UMVE is known as Merge with MVD (MMVD).

2.4 Generalized Bi-prediction

In conventional bi-prediction, the predictors from L0 and L1 are averaged to generate the final predictor using the equal weight 0.5. The predictor generation formula is shown as in Equ. (3)

$$P_{TraditionalBiPred} = (P_{L0} + P_{L1} + \text{RoundingOffset}) >> \text{shiftNum}, \quad (1)$$

In Equ. (3), $P_{TraditionalBiPred}$ is the final predictor for the conventional bi-prediction, $P_{L0}$ and $P_{L1}$ are predictors from L0 and L1, respectively, and RoundingOffset and shiftNum are used to normalize the final predictor.

Generalized Bi-prediction (GBI) is proposed to allow applying different weights to predictors from L0 and L1. GBI is also know as "Bi-prediction with CU-level weights (BCW)." The predictor generation is shown in Equ. (4).

$$P_{GBi} = ((1-w_1)*P_{L0} + w_1*P_{L1} + \text{RoundingOffset}_{GBi}) >> \text{shiftNum}_{BGi}, \quad (2)$$

In Equ. (4), $P_{GBi}$ is the final predictor of GBi. $(1-w_1)$ and $w_1$ are the selected GBI weights applied to the predictors of L0 and L1, respectively. RoundingOffset$_{GBi}$ and shiftNum$_{GBi}$ are used to normalize the final predictor in GBi.

The supported weights of $w_1$ is $\{-1/4, 3/8, 1/2, 5/8, 5/4\}$. One equal-weight set and four unequal-weight sets are supported. For the equal-weight case, the process to generate the final predictor is exactly the same as that in the conventional bi-prediction mode. For the true bi-prediction cases in random access (RA) condition, the number of candidate weight sets is reduced to three.

For advanced motion vector prediction (AMVP) mode, the weight selection in GBI is explicitly signaled at CU-level if this CU is coded by bi-prediction. For merge mode, the weight selection is inherited from the merge candidate. In this proposal, GBI supports DMVR to generate the weighted average of template as well as the final predictor for BMS-1.0.

2.5 Local illumination compensation

Local Illumination Compensation (LIC) is based on a linear model for illumination changes, using a scaling factor a and an offset b. And it is enabled or disabled adaptively for each inter-mode coded coding unit (CU).

Figure 10:
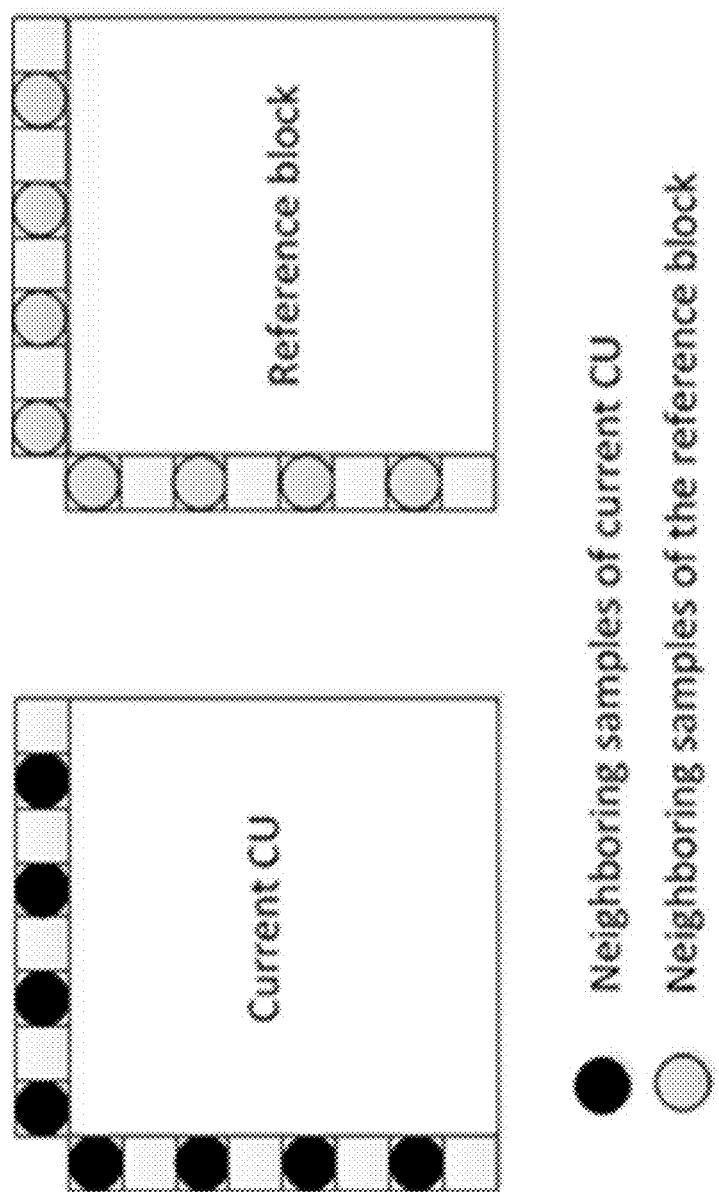
FIG. 10 shows an example of neighboring samples used for deriving IC parameters.

FIG. 10 shows an example of neighbouring samples used for deriving IC parameters.

When LIC applies for a CU, a least square error method is employed to derive the parameters a and b by using the neighbouring samples of the current CU and their corresponding reference samples. More specifically, as illustrated in FIG. 10, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighbouring blocks, in a way similar to motion information copy in merge mode; otherwise, an LIC flag is signalled for the CU to indicate whether LIC applies or not.

When LIC is enabled for a picture, addtional CU level RD check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM.

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.6 Current picture referencing

Decoder aspect:

In this approach, the current (partially) decoded picture is considered as a reference picture. This current picture is put in the last position of reference picture list 0. Therefore, for a slice using the current picture as the only reference picture, its slice type is considered as a P slice. The bitstream syntax in this approach follows the same syntax structure for inter coding while the decoding process is unified with inter coding. The only outstanding difference is that the block vector (which is the motion vector pointing to the current picture) always uses integer-pel resolution.

Changes from block level CPR_flag approach are:

In encoder search for this mode, both block width and height are smaller than or equal to 16.

Enable chroma interpolation when luma block vector is an odd integer number.

Enable adaptive motion vector resolution (AMVR) for CPR mode when the SPS flag is on. In this case, when AMVR is used, a block vector can switch between 1-pel integer and 4-pel integer resolutions at block level.

Encoder aspect:

The encoder performs RD check for blocks with either width or height no larger than 16. For non-merge mode, the block vector search is performed using hash-based search first. If there is no valid candidate found from hash search, block matching based local search will be performed.

In the hash-based search, hash key matching (32-bit CRC) between the current block and a reference block is extended to all allowed block sizes. The hash key calculation for every position in current picture is based on 4×4 blocks. For the current block of a larger size, a hash key matching to a reference block happens when all its 4×4 blocks match the hash keys in the corresponding reference locations. If multiple reference blocks are found to match the current block with the same hash key, the block vector costs of each candidates are calculated and the one with minimum cost is selected.

In block matching search, the search range is set to be 64 pixels to the left and on top of current block, and the search range is restricted to be within the current CTU.

3. Examples of problems solved by the disclosed embodiments

There are some potential problems:

UMVE cannot be switched on/off at slice level, picture level etc. This is not flexible.

For UMVE mode, the base candidate list size, distance table size and direction table size are fixed and cannot changed.

For UMVE mode, in bi-prediction case, only one MVD is signaled, and is used (with or without scaling) for both prediction directions, which may be inefficient.

One fixed MVD set is used in all cases, which may be inefficient.

How to harmonize UMVE with CPR is not well defined.

GBi only works for bi-prediction case.

For P pictures which can only use current picture as the reference picture, coding tools like affine, sub-block based merge, multi-hypothesis intra/inter prediction, triangle prediction and MMVD are disabled. However, flags are still signaled at CU level for these coding tools, which is unreasonable.

4. Examples of techniques implemented by various embodiments

Hereinafter, we call inter pictures which can only use current picture as the reference picture as CPR only inter pictures. The list below should be considered as examples to explain general concepts. The examples should not be interpreted in a narrow way. Furthermore, these techniques can be combined in any manner.

1. It is proposed that a UMVE flag may be signaled in slice header/tile group header/tile header/picture header/PPS/SPS/VPS etc. to indicate whether UMVE is enabled or not.
   a. In one example, another flag may be signaled to indicate whether affine merge mode with prediction offsets (i.e., UMVE applied to normal affine merge mode) is enabled or not.
   b. Alternatively, only one flag is signaled to indicate whether both UMVE and affine merge mode with prediction offsets (i.e., UMVE applied to normal affine merge mode) are enabled or not.

2. It is proposed that base candidate list size may be signaled for UMVE in slice header/tile group header/tile header/picture header/PPS/SPS/VPS etc.
   a. In one example, the base candidate list size is set equal to 1 or 2 or 3.
   b. In one example, the base candidate list size shall not be greater than the merge candidate list size.
   c. In one example, there is no need to signal the base candidate list size separately. Instead, the base candidate list size is deferred to be the same as the regular merge list size.

3. It is proposed that base candidate list size may be signaled for affine merge mode with prediction offsets in slice header/tile group header/tile header/picture header/PPS/SPS/VPS etc.
   a. In one example, the base candidate list size is set equal to 1 or 2 or 3.
   b. In one example, the base candidate list size shall not be greater than the sub-block merge candidate list size.
   c. In one example, there is no need to signal the base candidate list size separately. Instead, the base candidate list size is deferred to be the same as the sub-block merge list size when UMVE is applied to an affine coded block.

4. It is proposed that distance table or/and direction table may be signaled for UMVE in slice header/tile group header/tile header/picture header/PPS/SPS/VPS etc.
   a. In one example, only distance table size or/and direction table size are signaled, denote as K1 and K2, and the first K1 elements in the default distance table size or/and the first K2 elements in direction table are valid.
   b. In one example, only distance table size or/and direction table size are signaled, denote as K1 and K2, and the last K1 elements in the default distance table size or/and the last K2 elements in direction table are valid.

5. One flag may be signaled to indicate whether fractional distance is allowed or disallowed.
   a. The flag may be signaled in slice header/tile group header/tile header/picture header/PPS/SPS/VPS etc.
   b. The flag may be signaled under the condition that indications of usage of UMVE indicate UMVE is allowed.
   c. The flag may be signaled under the condition that indications of usage of affine merge mode with MVD offsets is allowed.
   d. The flag may be signaled in two levels. A first flag may be signaled in SPS/VPS/PPS to indicate whether a second flag will be signaled in PPS/slice header/tile group header/tile header.
      i. In one example, if the first flag is false (or true), fractional distances are always enabled, and the second flag may be not signaled.
      ii. In one example, if the first flag is true (or false), fractional distances may be disabled, and the second flag is signaled. If the second flag is true (or false), then fractional distances are enabled for the picture/slice/tile group/tile; otherwise, fractional distances are disabled for the picture/slice/tile group/tile.
   e. In one example, the first flag sps_fracmmvd_disabled_flag is signaled in SPS, and the second flag tile_group_fracmmvd_disabled_flag is signaled in tile group header.
      i. When sps_fracmmvd_disabled_flag is false, disabling fractional distances is not applied, and tile_group_fracmmvd_disabled_flag is not signaled and is inferred to be false.
      ii. When sps_fracmmvd_disabled_flag is true, disabling fractional distances is applied, and tile_group_fracmmvd_disabled_flag is signaled.
      iii. When tile_group_fracmmvd_disabled_flag is true, fractional distances are disabled for the tile group; otherwise, fractional distances are enabled for the tile group.
   f. In one example, the first flag sps_fracmmvd_disabled_flag is signaled in SPS, and the second flag tile_group_fracmmvd_flag is signaled in tile group header.
      i. When sps_fracmmvd_disabled_flag is false, disabling fractional distances is not applied, and tile_group_fracmmvd_flag is not signaled and is inferred to be true.
      ii. When sps_fracmmvd_disabled_flag is true, disabling fractional distances is applied, and tile_group_fracmmvd_flag is signaled. iii. When tile_group_fracmmvd_flag is true, fractional distances are enabled for the tile group; otherwise, fractional distances are disabled for the tile group.
   g. Alternatively, furthermore, when the fractional distance is disallowed, only integer distance are allowed.

h. Alternatively, furthermore, when the fractional distance is disallowed, only integer distances or/and distances with lower precision than integer-precision are allowed.
  i. Alternatively, furthermore, truncated unary of distance index may be used to code the distance index and the maximumly allowed distance index depends on the number of allowed integer distances if the flag indicates fractional distance is disallowed.
j. Alternatively, when the fractional distance is disallowed, all elements in the default distance table are multiplied by a factor to generate integer distances.
  i. For example, all the elements are multiplied by 4.
k. The flag may be shared by UMVE (i.e., regular merge mode with MVD offsets) and affine merge mode with MVD offsets.
l. Alternatively, the flag may be signaled for UMVE and affine merge mode with MVD offsets separately.

6. One flag may be signaled to indicate whether fractional MV/MVD precision is allowed or disallowed for AMVP mode or/and affine inter mode.
  a. The flag may be signaled in slice header/tile group header/tile header/picture header/PPS/SPS/VPS etc al.
  b. The flag may be signaled under the condition that indications of usage of AMVR (adaptive motion vector resolution) is allowed.
  c. The flag may be signaled under the condition that indications of usage of AMVR for affine inter mode is allowed.
  d. The flag may be signaled in two levels. A first flag may be signaled in SPS/VPS/PPS to indicate whether a second flag will be signaled in PPS/slice header/tile group header/tile header.
    i. In one example, if the first flag is false (or true), fractional MV/MVD are always enabled, and the second flag may be not signaled.
    ii. In one example, if the first flag is true (or false), fractional MV/MVD may be disabled, and the second flag is signaled. If the second flag is true (or false), then fractional MV/MVD are enabled for the picture/slice/tile group/tile; otherwise, fractional MV/MVD are disabled for the picture/slice/tile group/tile.
  e. Alternatively, furthermore, when the fractional MV/MVD is disallowed, only integer-precision MV/MVD are allowed.
  f. Alternatively, furthermore, when the fractional MV/MVD is disallowed, only integer-precision or/and lower precision than integer-precision MV/MVD are allowed.
  g. Alternatively, furthermore, truncated unary code may be used to encode the AMVR index depending on the number of allowed MV/MVD precisions if the flag indicates that fractional MV/MVD is disallowed.
  h. The flag may be shared by AMVR mode and AMVR for affine inter mode.
  i. Alternatively, the flag may be signaled for AMVR mode and AMVR for affine inter mode separately.
  j. Alternatively, the flag may be shared by AMVR mode, AMVR for affine inter mode, UMVE mode and affine merge mode with MVD offsets.

7. It is proposed that distance table or/and direction table may be signaled for affine merge mode with prediction offsets in slice header/tile group header/tile header/picture header/PPS/SPS/VPS etc.
  a. In one example, only distance table size or/and direction table size are signaled, denote as K1 and K2, and the first K1 elements in the default distance table size or/and the first K2 elements in direction table are valid.
  b. In one example, only distance table size or/and direction table size are signaled, denote as K1 and K2, and the last K1 elements in the default distance table size or/and the last K2 elements in direction table are valid.
  c. In one example, a flag may be signaled to indicate whether fractional distance is used or not.

8. It is proposed that two MVDs may be coded for a block coded with bi-prediction and UMVE mode.
  a. In one example, one MVD is encoded for each prediction direction.
    i. The number of MVD used in UMVE may be signaled from the encoder to the decoder.
    ii. Alternatively, The number of MVD used in UMVE may be derived at decoder.
  b. In one example, one MVD is encoded for each prediction direction, and MVD of prediction direction LX may be used to predict L(1−X).
    i. The MVD for list0 may be signaled first, or The MVD for list1 may be signaled first.
      (i) This order may be signaled.
  c. In addition, base candidate index and/or distance index and/or direction index for both prediction directions may be signaled.
  d. In one example, more than two MVDs (such as three or four) may be signaled for UMVE mode.

9. It is proposed that distance table or/and direction table may depend on POC of the two reference pictures as well as the POC of the current picture, or QP of the current block/slice/picture.
  a. In one example, the tables may depend on the POC differences of the two reference pictures and the current picture.

10. Indications of multiple sets of UMVE parameters (e.g., multiple sets of distance tables or/and direction tables) may be signaled or pre-defined for UMVE in slice header/tile group header/tile header/picture header/PPS/SPS/VPS etc. al.
  a. Alternatively, one set of distance tables or/and direction tables may be signaled or pre-defined. And multiple sets may be derived from the signaled/pre-defined set, such as by shifting the available distance values.
    i. In one example, indications of how to shift the available distance values may be signaled in slice header/tile group header/tile header/picture header/PPS/SPS/VPS etc. al.
      (i) In one example, indications of whether to use left shift or right shift may be signaled.
      (ii) In one example, indications of how many bits for left shift may be signaled.
    ii. In one example, one bit flag is signaled in slice header/tile group header/tile header/picture header/PPS/SPS/VPS etc. al to indicate whether the existing distance table is used or each of the distance value is left shifted by M (e.g., M=2).
    iii. In one example, indications of bits to be left (and/or right) shifted may be signaled in slice header/tile group header/tile header/picture header/PPS/SPS/VPS etc. al.
  b. Alternatively, the allowed indices of multiple sets of UMVE parameters (e.g., distance tables or/and direction tables (e.g., a sub-set of the signaled/pre-defined multiple sets)) may be further signaled in slice header/tile group header/tile header/picture header/PPS/VPS/CTU row/group of CTUs etc. al.

c. Alternatively, the selection of one of the multiple sets of UMVE parameters (e.g., distance tables or/and direction tables) may depend on the coded mode, e.g., CPR or not.
d. Alternatively, the selection of one of the multiple sets of UMVE parameters (e.g., distance tables or/and direction tables) may depend on the picture/sequence resolution.
e. Alternatively, the selection of one of the multiple sets of UMVE parameters (e.g., distance tables or/and direction tables) of one block may depend on the selected base merge candidate.
  i. In one example, it may depend on the motion vector magnitudes/sign values.
    (i) In one example, if the magnitude of motion vector is larger, a distance table with larger step sizes may be utilized.
  ii. In one example, it may depend on reference picture/POC values of the selected base merge candidate, e.g., whether all or at least one of the reference picture is current picture (i.e., CPR).
  iii. In one example, it may depend on whether the motion vector of the selected base merge candidate is pointing to integer position or sub-positions (e.g., ¼, 1/16, 1/8, ½-pel).
  iv. Selection may depend on the category of merge candidate (e.g., spatial or temporal or HMVP or others) which the base merge candidate denotes.
  v. Selection may depend on the location where the merge candidate is derived from (e.g., left/above/) that the base merge candidate denotes.
  vi. Selection may depend on the index of the merge candidate in the merge list that the base merge candidate denotes.
f. Alternatively, the selection of one of the multiple sets of UMVE parameters (e.g., distance tables or/and direction tables) of one block's dimension.
  i. In one example, if one block has more than M×N (e.g., 16×16) samples, one set of UMVE parameters may be utilized and for other blocks, another set may be utilized.
  ii. In one example, if the width of one block has more than M (e.g., 16) samples, one set of UMVE parameters may be utilized and for other blocks, another set may be utilized.
  iii. In one example, if the height of one block has more than M (e.g., 16) samples, one set of UMVE parameters may be utilized and for other blocks, another set may be utilized.
g. Alternatively, furthermore, there is no need to further signal the selected distance tables or/and direction tables. The selection of distance tables or/and direction tables may be derived at the block level/slice/tile/picture level.
h. Alternatively, indices of selected distance tables or/and direction tables may be further signaled in block-level/CTU-level/region-level/CTU row level/slice/tile/picture level.
i. In one example, multiple sets of distance tables or/and direction tables may be defined and each of them may be associated with a given motion vector precision (e.g., integer-pel, sub-pel; 1-pel, 4-pel, ¼-pel, 1/16-pel).
  i. In one example, the number of multiple sets may depend on how many motion vector precisions are allowed for one sequence/view/picture/slice/tile/other kinds of video data processing units.
  ii. Alternatively, furthermore, for a base merge candidate derived from one block, the associated AMVR index may be also inherited to decide the distance table or/and direction table.
    (i) In one example, such block is a spatial adjacent or non-adjacent block. Alternatively, furthermore, such block is a spatial adjacent or non-adjacent block located in the same CTU/CTU row/region/tile/slice.
    (ii) In one example, if one block is a temporal block, the AMVR index is not inherited.
    (iii) In one example, if the base merge candidate derived from a virtual merge candidate (e.g., pairwise bi-prediction merge candidate, zero motion vector merge candidate), the AMVR index is not inherited.
    (iv) Alternatively, furthermore, if the AMVR index is not inherited, a default distance table or/and direction table may be utilized instead.
  iii. Alternatively, furthermore, for each HMVP candidate, the AMVR index may be further stored.

11. Selected UMVE parameters (e.g., distance table or/and direction table) may be adaptively changed from one block to anther block, from one reference picture list to another reference picture list, from one reference picture to another reference picture, from tile to tile, from slice to slice, from picture to picture, from sequence to sequence, from temporal layer to temporal layer.
  a. In one example, selection of UMVE parameters may depend on the component of the motion vectors, i.e., horizontal component and vertical component, considering majority of camera captured sequences have a large motion in horizontal direction compared to vertical direction.

12. It is proposed that when UMVE is harmonized with CPR mode, some distances are not allowed.
  a. In one example, distances with fractional precision like 1/4 or 1/2 are not allowed.
  b. In one example, distances that are out of the valid search range in CPR are not allowed.
  c. In one example, when the selected distance is disallowed according to the distance table, it may be replaced by other valid distances.
  d. Alternatively, different sets of mapping between distance indices and pixel distances may be defined, one is for CPR mode, and the other for non-CPR mode.
  e. In one example, a predefined delta MV, i.e. (MVx, MVy), is added to the starting point of UMVE when UMVE is applied for a block.
  f. In one example, the predefined delta MV may depend on block size.
  g. Alternatively, the predefined delta MV may depend on the reference index.
  h. Alternatively, the predefined delta MV may depend on color component.
  i. Alternatively, the delta MV added to the starting point can be signaled at slice header/tile group header/tile header/picture header/PPS/SPS/VPS etc al.
  j. Alternatively, a set of delta MVs added to the starting point can be signaled at slice header/tile group header/tile header/picture header/PPS/SPS/VPS etc al.Alternatively, for different block size, reference index, a delta MV can be signaled at slice header/tile group header/tile header/picture header/PPS/SPS/VPS etc.

k. In one example, uni-prediction is always applied when UMVE is harmonized with CPR mode.
   i. Only one MVD is used or signaled.
l. Similarly, if one base merge candidate has at least one or all reference picture is current picture (e.g., CPR), some direction index may be disallowed.
   i. Alternatively, the disallowed direction index may be replaced by other valid direction index.
m. In this case, for a merge candidate/AMVP candidate, if it has all or at least one of reference pictures is current picture, UMVE may still be applied.

13. For the UMVE coded block, the decoded MVD based on decoded distance index and direction index may be further refined.
   a. Whether to refine the decoded MVD may depend on the motion information associated with merge candidates in the merge candidate list.
      i. In one example, if the selected base candidate plus the decoded MVD would be identical to another merge candidate, the decoded MVD may be further refined, e.g., by using a different distance index or direction index.
      ii. In one example, if the selected base candidate plus the decoded MVD would be similar to another merge candidate, the decoded MVD may be further refined, e.g., by using a different distance index or direction index.
         (i) For example, when |MV1x−MV2x|+|MV1y−MV2y|<T, then MV1 and MV2 are regarded to be similar.
         (ii) Two candidates are regarded to be similar if they share the same reference indices and the MVs referring to the same reference picture are similar.
   b. BIO may be disallowed to UMVE coded blocks.
   c. DMVR may be disallowed to UMVE coded blocks.

14. For the UMVE coded block, the mapping between coded base candidate index and the candidate index in a merge candidate list may be changed from block to block, from tile to tile, from picture to picture, from sequence to sequence.
   a. The coded base candidate index equal to 0 always corresponds to the first merge candidate in the candidate list. However, the coded base candidate index equal to K (K>0) may not correspond to the (K+1)-th candidate in the candidate list.
   b. In one example, the coded base candidate index (CBCI) equal to 1 may indicate a merge candidate in the merge candidate list that is not similar with the first candidate that CBCI equal to 0 pointing to.
      i. For example, when the first two merge candidates are similar (e.g., only MVs are different, but the difference of MVs is smaller or equal to a threshold), the coded base candidate index equal to 1 may correspond to the third merge candidate if the third one is not similar with the first merge candidate.
   c. In one example, the mapping or the selection of base merge candidate from the merge candidate list may depend on the first merge candidate in the candidate list.
      i. For example, only merge candidates with the same reference pictures as the first merge candidates may be treated as base merge candidate.
      ii. For example, only merge candidates with at least one of reference pictures or at least one of reference indices same as the first merge candidates may be treated as base merge candidate.
      iii. For example, only merge candidates with at least one of motion vector precisions same as the first merge candidates may be treated as base merge candidate.
      iv. In above examples, 'same' may be replaced by 'different'.
   d. Some merge candidates may be disallowed to be utilized as the base merge candidate in the UMVE mode.
      i. In one example, virtual merge candidates (e.g., combined bi-prediction merge candidates, pairwise merge candidates, zero motion vector merge candidates) are disallowed.
      ii. In one example, temporal merge candidates and/or HMVP candidates are disallowed.
      iii. In one example, if one merge candidate is derived from certain mode (e.g., triangular prediction mode, sub-block mode, affine or ATMVP or STMVP), such candidate is disallowed.
      iv. When one candidate is disallowed to be utilized as the base merge candidate, the next or other remaining ones may be used instead.
      v. One or more base merge candidates may be not from the merge candidate list.
         (i) one or more based merge candidates may be derived from available merge candidates (e.g., scaling to different reference pictures; only keep the LX motion information (e.g., X=0 or 1)).
         (ii) one or more based merge candidates may be derived from default motion vector candidates (e.g., (-W, -H) wherein W and H are the width and height of current block).
   e. Alternatively, for above methods, the first candidate may be restricted to be the first non-CPR candidate.
   f. Base merge candidates may be defined to those merge candidates in the merge list which have enough big differences.
      i. In one example, if two merge candidates are similar (e.g., same reference pictures and MV differences smaller than a threshold), the second of the two candidates couldn't be a valid base merge candidate.

15. In all of above examples, distance tables or/and direction tables may be replaced by other ways for representation of UMVE.

16. In all of above examples, the signaling/derivation of distance tables may be replaced by AMVR precisions. Suppose one set of AMVR precisions is denoted by {1/4-Pel, 1-Pel, 4-Pel}.
   a. In one example, indication of whether to scale the MV precisions defined in the AMVR precision set may be signaled slice header/tile group header/tile header/picture header/PPS/SPS/VPS etc. al. For example, if scaling is utilized, the modified set of AMVR precisions may be defined as {1-pel, 4-pel, 16-pel}, i.e., scaled by 4.
   b. Alternatively, multiple sets of AMVR precisions may be defined or signaled.
   c. Alternatively, indications of set index may be signaled or derived on-the-fly, such as based on block's coded information or previously coded information.
   d. Set of allowed AMVR precisions may be changed from one video unit to another (e.g., block/PU/CU/CTU/CTU row/tile/slice/picture/region, etc. al).
   e. Mapping between signaled MV precision index and real MV precision may be changed from one video unit to another (e.g., block/PU/CU/CTU/CTU row/tile/slice/picture/region, etc. al).

17. It is proposed that for the case that all reference pictures are current pictures, flags related to affine, sub-block based merge, multi-hypothesis intra/inter prediction, triangle prediction and MMVD may be not signaled.

18. It is proposed that GBi may be disabled/enabled at slice level/tile level/picture level, and one GBi on/off flag may be signaled at slice header/tile header/PPS.
   a. In one example, GBi may be disabled for a picture if temporal layer of the picture is higher than a threshold T, for example, T=3.
   b. In one example, GBi may be disabled for pictures that are not referenced by other pictures.
   c. In one example, GBi may be disabled for pictures whose QP are larger than a threshold $QP_T$, for example, $QP_T$=40.
   d. In one example, GBi may be disabled implicitly (i.e., without signaling GBi index) for blocks whose QP are larger than a threshold $QP_T$, for example, $QP_T$=40.

19. It is proposed that the weighting factor set used in GBi may depend on temporal layer of the picture, or QP of the picture, or QP of the block.
   a. In one example, fewer weighting factors are used for pictures with higher temporal layer.
   b. In one example, fewer weighting factors are used for pictures/blocks coded with higher QP.

20. It is proposed that the besides the default weighting factor set, other weighting factor sets may be used in GBi, and these weighting factor sets may be signaled in the slice header/tile header/PPS.
   a. In one example, one flag is signaled in slice header/tile header/PPS to indicate whether the default weighting factor set is used, if not, the used weighting factor set is further signaled.

21. It is proposed that GBi may be extended to uni-prediction case, wherein a weighting factor set is designed, and a weighting factor is selected at block/CU level.
   a. In one example, a GBi index is signaled for AMVP mode or/and affine inter mode in uni-prediction case and is inherited in merge mode or UMVE mode or affine merge mode or affine merge mode with offsets.
   b. For example, the weight factor set is {10/8, 9/8, 1, 7/8, 6/8}.

22. It is proposed that one or multiple offset sets may be designed in GBi or/and extended GBi (in bullet 21), wherein the motion compensated block may be refined with a selected offset. In this case, after the motion compensation, each prediction sample may be further added with an offset to get the final prediction sample.
   a. An offset index may be signaled for each CU/block.
   b. In one example, when the default weighting factor (e.g., 1/2 in bi-prediction case and 1 in uni-prediction case) is not selected, an offset index is further signaled in AMVP mode or affine inter mode.
   c. In one example, the offset index is always signaled no matter the selected weighting factor is the default weighting factor or not.
   d. In one example, the offset index is inherited in merge mode or UMVE mode or affine merge mode or affine merge mode with offsets.

23. It is proposed that neighboring pixels of current block/CU and the corresponding reference neighboring pixels identified by MVs (or integer part of the MV) of current block may be used to select the GBi index implicitly. In this case, no GBi index is signaled and only one GBi flag is signaled to indicate whether current block use the default weighting factor or the selected weighting factor.
   a. In one example, for each weighting factor, the reference neighboring pixels in both directions are weighted averaged and the difference between it and the neighboring pixels is calculated. The weighting factor achieving the smallest difference is selected as the weighting factor of current block.
   b. In one example, the difference may be measured by e.g., SAD, MRSAD, SSE or MRSSE, SATD.
   c. In one example, the difference may be calculated on some representative neighboring positions.
   d. In one example, such GBi flag is inherited in merge mode or UMVE mode or affine merge mode or affine merge mode with offsets.
   e. In one example, suppose the sum (or average) of neighbouring samples of the current block is S0, the sum (or average) of neighbouring samples of the reference block is S1, then GBi weighting values can be derived by S0 and S1.
      i. In one example, S0/S1 is used to derive weighting values. Division can be replaced by multiplication, shift and a look up table.
      ii. Neighbouring samples of the reference block must be integer samples.

24. It is proposed that neighboring pixels of current block/CU and the corresponding reference neighboring pixels identified by MVs (or integer part of the MV) of current block may be used to reorder the GBi index.
   a. In one example, for each weighting factor, the reference neighboring pixels in both directions are weighted averaged and the difference between it and the neighboring pixels is calculated. The weighting factors are then reordered in ascending order of the difference.

25. It is proposed that the derived LIC parameters may be used as one of the weighting factor in GBi.
   a. In one example, when deriving the LIC parameters, the offset is assumed to zero and only the weighting factor is derived, i.e., the LIC model is changed to y=ax.
   b. In one example, both the weighting factor and the offset derived in LIC are used in GBi.
   c. In one example, in merge mode or UMVE mode or affine merge mode or affine merge mode with offsets, the weighting factor used in GBi is inherited from neighboring block directly.
      i. Alternatively, if the inherited neighboring weighting factor is actually a derived LIC parameters, new LIC parameters are derived and are used for current block/CU.
      ii. Alternatively, in merge mode or/and UMVE mode, if the inherited neighboring weighting factor is actually a derived LIC parameters, new LIC parameters are derived and are used for current block/CU.

5. Example embodiments

This section shows some embodiments for the improved UMVE design.

5.1 Embodiment #1

In this embodiment, a flag of whether fractional distance is allowed is signaled. The changes compared to the latest VVC specification are highlighted using {{}}. 7.3.2.1 Sequence parameter set RBSP syntax

| | Descriptor |
|---|---|
| seq_parameter_set_rbsp( ) { | |
|   sps_seq_parameter_set_id | ue(v) |
|   chroma_format_idc | ue(v) |
|   if( chroma_format_idc = = 3 ) | |

-continued

| | Descriptor |
|---|---|
| separate_colour_plane_flag | u(1) |
| ... | |
| sps_ladf_enabled_flag | u(1) |
| {{sps_UMVE_enabled_flag}} | u(1) |
| {{if( sps_UMVE_enabled_flag) { }} | |
| {{sps__disable_fractional_distance}} | u(1) |
| {{ }}} | |
| if ( sps_ladf_enabled_flag ) { | |
| sps_num_ladf_intervals_minus2 | u(2) |
| sps_ladf_lowest_interval_qp_offset | se(v) |
| for( i = 0; i < sps_num_ladf_intervals_ minus2 + 1; i++ ) { | |
| sps_ladf_qp_offset[ i ] | se(v) |
| sps_ladf_delta_threshold_minus1[ i ] | ue(v) |
| } | |
| } | |
| rbsp_trailing_bits( ) | |
| } | |

Semantics

{{sps_UMVE_enabled_flag equal to 0 specifies that the UMVE (MMVD) is disabled. sps_UMVE_enabled_flag equal to 1 specifies that the UMVE is enabled.}}

{{sps_disable_fractional_distance equal to 0 specifies that fractional pixel distance of the UMVE (MMVD) is enabled. sps_disable_fractional_distance equal to 1 specifies that fractional pixel distance of the UMVE is disabled.}}

Alternatively, sps_disable_fractional_distance may be replaced by sps_enable_fractional_distance. Alternatively, sps_disable_fractional_distance may be directly coded.

Alternatively, sps_UMVE_enabled_flag, sps_disable_fractional_distance may be further signalled in picture header/PPS/slice header/tile group header/region/CTU rows/groups of CTUs/CTU.

mmvd_distance_idx[ x0 ][ y0 ] specifies the index used to derive MmvdDistance[ x0 ][ y0 ] as specified in Table 7-7 {{for sps_disable_fractional_distance equal to 0 and Table 7-x for sps_disable_fractional_distance equal to 1}}. The array indices x0, y0 specify the location ( x0, y0 ) of the top-left luma sample of the considered coding block relative to the top-left luma sample of the picture.

TABLE 7-7

Specification of MmvdDistance[ x0 ][y0 ] based on mmvd_distance_idx[ x0 ][ y0 ] {{when sps_disable_fractional_distance is equal to 0.}}

| mmvd_distance_idx [ x0 ][ y0 ] | MmvdDistance [ x0 ][ y0 ] |
|---|---|
| 0 | 1 |
| 1 | 2 |
| 2 | 4 |
| 3 | 8 |
| 4 | 16 |
| 5 | 32 |
| 6 | 64 |
| 7 | 128 |

TABLE7-x

{{ Specification of MmvdDistance[ x0 ][ y0 ] based on mmvd_distance_idx[ x0 ][ y0 ] when sps_disable_fractional_distance is equal to 1.}}

| mmvd_distance_idx[ x0 ][ y0 ] | MmvdDistance[ x0 ][ y0 ] |
|---|---|
| 0 | 4 |
| 1 | 8 |
| 2 | 16 |
| 3 | 32 |
| 4 | 64 |
| 5 | 128 |

TABLE 9-4

Syntax elements and associated binarizations

| Syntax structure | Syntax element | Binarization | |
|---|---|---|---|
| | | Process | Input parameters |
| slice_data( ) | end_of_slice_flag | FL | cMax = 1 |
| coding_unit( ) | cu_skip_flag[ ][ ] | FL | cMax = 1 |
| | pred_mode_flag | FL | cMax = 1 |
| | pcm_flag[ ][ ] | FL | cMax = 1 |
| | intra_luma_ref_idx[ ][ ] | TR | cMax = 2, cRiceParam = 0 |
| | mmvd_merge_flag[ ][ ] | FL | cMax = 1 |
| | mmvd_distance_idx[ ][ ] | TR | cMax = 7, cRiceParam = 0 when sps_disable_fractional_distance is equal to 0; cMax = 5, cRiceParam = 0 when sps_disable_fractional_distance is equal to 1. |
| | mmvd_direction_idx[ ][ ] | FL | cMax = 3 |
| | merge_idx[ ][ ] | TR | cMax = MaxNumMergeCand - 1, cRiceParam = 0 |
| | mh_intra_flag[ ][ ] | FL | cMax = 1 |

5.2 Embodiment #2

In this embodiment, indications of distance tables is signaled. The changes compared to the latest VVC specification are highlighted using {{}}.

7.3.2.1 Sequence parameter set RBSP syntax

| | Descriptor |
|---|---|
| seq_parameter_set_rbsp( ) { | |
| sps_seq_parameter_set_id | ue(v) |
| chroma_format_idc | ue(v) |
| ... | |
| sps_ladf_enabled_flag | u(1) |
| {{sps_UMVE_enabled_flag}} | u(1) |
| {{if( sps_UMVE_enabled_flag) { }} | |
| {{sps_distance_tables}} | u(M) |
| {{ }}} | |
| if ( sps_ladf_enabled_flag ) { | |
| sps_num_ladf_intervals_minus2 | u(2) |
| sps_ladf_lowest_interval_qp_offset | se(v) |
| for( i = 0; i < sps_num_ladf_intervals_ minus2 + 1; i++ ) { | |

-continued

| | Descriptor |
|---|---|
| sps_ladf_qp_offset[ i ] | se(v) |
| sps_ladf_delta_threshold_minus1[ i ] | ue(v) |
| } | |
| } | |
| rbsp_trailing_bits( ) | |
| } | |

7.3.2.2 Picture parameter set RBSP syntax

| | Descriptor |
|---|---|
| pic_parameter_set_rbsp( ) { | |
|   pps_pic_parameter_set_id | ue(v) |
|   pps_seq_parameter_set_id | ue(v) |
|   ... | |
|   if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|     } | |
|   } | |
|   {{if(sps_distance_tables) { }} | |
|     {{index_distance_table}} | u(M) |
|   {{ }}} | |
|   rbsp_trailing_bits( ) | |
| } | |

Semantics sps_UMVE_enabled_flag equal to 0 specifies that the UMVE (MMVD) is disabled. sps_UMVE_enabled_flag equal to 1 specifies that the UMVE is enabled.

sps_distance_tables equal to L specifies that (L+1) distance tables of the UMVE (MMVD) are defined.

index_distance_table equal to L specifies that L-th distance tables of the UMVE (MMVD) is used.

In one example, M is set to 2.

Alternatively, sps_distance_tables may be directly coded.

Alternatively, sps_UMVE_enabled_flag, sps_distance_tables, index_distance_table, may be further signalled in picture header/PPS/slice header/tile group header/region/CTU rows/groups of CTUs/CTU.

TABLE 7-7

Specification of MmvdDistance[ x0 ][ y0 ] based on mmvd_distance_idx[ x0 ][ y0 ]
{{when sps_disable_fractional_distance is equal to 0.}}

| mmvd_distance_idx [ x0 ][ y0 ] | {{index_distance_table = 0}} MmvdDistance[ x0 ][ y0 ] | {{index_distance_table = 1}} MmvdDistance[ x0 ][ y0 ] |
|---|---|---|
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

Alternatively, furthermore, when one base merge candidate is CPR, a different distance table may be utilized from those defined as above.

Alternatively, the direction table may be signaled/pre-defined.

5.3 Embodiment #3

In this embodiment, a flag of whether fractional distance is allowed is signaled. The changes compared to the latest VVC specification are highlighted using {{}}.

7.3.2.1 Sequence parameter set RBSP syntax

| | Descriptor |
|---|---|
| seq_parameter_set_rbsp( ) { | |
|   sps_seq_parameter_set_id | ue(v) |
|   chroma_format_idc | ue(v) |
|   if( chroma_format_idc = = 3 ) | |
|     separate_colour_plane_flag | u(1) |
|   ... | |
|   sps_ladf_enabled_flag | u(1) |
|   {{sps_UMVE_enabled_flag}} | u(1) |
|   {{if( sps_UMVE_enabled_flag) { }} | |
|     {{sps_disable_fractional_distance}} | u(1) |
|   {{ }}} | |
|   if ( sps_ladf_enabled_flag ) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|       sps_ladf_qp_offset[ i ] | se(v) |
|       sps_ladf_delta_threshold_minus1[ i ] | ue(v) |
|     } | |
|   } | |
|   rbsp_trailing_bits( ) | |
| } | |

Semantics

{{sps_UMVE_enabled_flag equal to 0 specifies that the UMVE (MMVD) is disabled. sps_UMVE_enabled_flag equal to 1 specifies that the UMVE is enabled.}}

{{sps_disable_fractional_distance equal to 0 specifies that fractional pixel distance of the UMVE (MMVD) is enabled. sps_disable_fractional_distance equal to 1 specifies that fractional pixel distance of the UMVE is disabled.}}

Alternatively, sps_disable_fractional_distance may be replaced by sps_enable_fractional_distance. Alternatively, sps_disable_fractional_distance may be directly coded.

Alternatively, sps_UMVE_enabled_flag, sps_disable_fractional_distance may be further signalled in picture header/PPS/slice header/tile group header/region/CTU rows/groups of CTUs/CTU.

mmvd_distance_idx [ x0 ][ y0 ] specifies the index used to derive MmvdDistance[ x0 ][ y0 ] as specified in Table 7-7 for {{sps_disable_fractional_distance}} equal to 0 and Table 7-x for {{sps_disable_fractional_distance}} equal to 1. The array indices x0, y0 specify the location ( x0, y0 ) of the top-left luma sample of the considered coding block relative to the top-left luma sample of the picture.

TABLE 7-7

Specification of MmvdDistance[ x0][ y0 ] based on mmvd_distance_idx[ x0 ][ y0]
{{when sps_disable_fractional_distance is equal to 0.}}

| mmvd_distance_idx[ x0 ][ y0 ] | MmvdDistance[ x0 ][ y0 ] |
|---|---|
| 0 | 1 |
| 1 | 2 |
| 2 | 4 |
| 3 | 8 |
| 4 | 16 |
| 5 | 32 |
| 6 | 64 |
| 7 | 128 |

29

TABLE 7-x

| {{ Specification of MmvdDistance[ x0 ][ y0 ] based on mmvd_distance_idx[ x0 ][ y0 ] when sps_disable_fractional_distance is equal to 1.}} | |
| --- | --- |
| {{mmvd_distance_idx[ x0 ][ y0 ]}} | {{MmvdDistance[ x0 ][ y0 ]}} |
| {{0}} | {{4}} |
| {{1}} | {{8}} |
| {{2}} | {{16}} |
| {{3}} | {{32}} |
| {{4}} | {{64}} |
| {{5}} | {{128}} |
| {{6}} | {{256}} |
| {{7}} | {{512}} |

5.4 Embodiment #4
7.3.3.1 General slice header syntax

| | Descriptor |
| --- | --- |
| slice_header( ) { | |
|   slice_pic_parameter_set_id | ue(v) |
|   ... | |
|   } | |
|   if ( slice_type != I ) { | |
|     if( sps_temporal_mvp_enabled_flag ) | |
|       slice_temporal_mvp_enabled_flag | u(1) |
|     if( slice_type = = B ) | |
|       mvd_l1_zero_flag | u(1) |
|     if( slice_temporal_mvp_enabled_flag ) { | |
|       if( slice_type = = B ) | |
|         collocated_from_l0_flag | u(1) |
|     } | |
|     six_minus_max_num_merge_cand | ue(v) |
|     if( sps_affine_enable_flag ) | |
|       five_minus_max_num_subblock_merge_cand | ue(v) |
|     {{enable_MMVD_distance_scale_flag}} | u(1) |
|   } | |
|   ... | |
|   byte_alignment( ) | |
| } | |

{{enable_MMVD_distance_scale_flag}} equal to 1 indicates scaling is applied to the default distance table. enable_MMVD_distance_scale_flag equal to 0 indicates the default distance table is utilized.

TABLE 7-x

{{ Specification of MmvdDistance[ x0 ][ y0 ] based on mmvd_distance_idx[ x0 ][ y0 ] when sps_disable_fractional_distance is equal to 1.}}

| mmvd_distance_idx [ x0 ][ y0 ] | MmvdDistance [ x0 ][ y0 ] (default table) | Modified MmvdDistance [ x0 ][ y0 ] (by scaling the default table) |
| --- | --- | --- |
| 0 | 1 (i.e., ¼-pel ) | 1 << M |
| 1 | 2 (i.e., ½-pel ) | 2 << M |
| 2 | 4 (i.e., 1 -pel ) | 4 << M |
| 3 | 8 | 8 << M |
| 4 | 16 | 16 << M |
| 5 | 32 | 32 << M |
| 6 | 64 | 64 << M |
| 7 | 128 | 128 << M |

In one example, M is set to 2. Alternatively, the left shift may be replaced by right shift.

5.5 Embodiment #5
The syntax change is described as follows, and the newly added parts are highlighted using {{}}.

30

7.3.2.1 Sequence parameter set RBSP syntax

| | Descriptor |
| --- | --- |
| seq_parameter_set_rbsp( ) ({ | |
|   ... | u(1) |
|   sps_gbi_enabled_flag | u(1) |
|   sps_mh_intra_enabled_flag | u(1) |
|   {{sps_fracmmvd_enabled_flag}} | {{u(1)}} |
|   sps_triangle_enabled_flag | u(1) |
|   sps_ladf_enabled_flag | u(1) |
|   if ( sps_ladf_enabled_flag ) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|       sps_ladf_qp_offset[ i ] | se(v) |
|       sps_ladf_delta_threshold_minus1[ i ] | ue(v) |
|     } | |
|   } | |
|   rbsp_trailing_bits( ) | |
| } | |

7.3.3.1 General tile group header syntax

| | Descriptor |
| --- | --- |
| tile_group_header( ) { | |
|   ... | |
|   if ( tile_group_type != I ) { | |
|     if( sps_temporal_mvp_enabled_flag ) | |
|       tile_group_temporal_mvp_enabled_flag | u(1) |
|     if( tile_group_type = = B ) | |
|       mvd_l1_zero_flag | u(1) |
|     if( tile_group_temporal_mvp_enabled_flag) { | |
|       if( tile_group_type = = B ) | |
|         collocated_from_l0_flag | u(1) |
|     } | |
|     six_minus_max_num_merge_cand | ue(v) |
|     if( sps_affine_enable_flag ) | |
|       five_minus_max_num_subblock_merge_cand | ue(v) |
|     {{if( sps_fracmmvd_enabled_flag )}} | |
|       {{tile_group_fracmmvd_flag}} | |
|   } | |
|   ... | se(v) |
|   byte_alignment( ) | |
| } | |

7.4.3.1 Sequence parameter set RBSP semantics

{{sps_fracmmvd_enabled_flag equal to 1 specifies that tile_group_fracmmvd_flag is present in the tile group header syntax table for B picture and P picture. sps_fracmmvd_enabled_flag equal to 0 specifies that tile_group_fracmmvd_flag is not present in the tile group header syntax table for B picture and P picture.}}

7.4.4.1 General tile group header semantics

{{tile_group_fracmmvd_flag equal to 1 specifies that merge mode with motion vector difference in fractional-pel precision is enabled in the current tile group. tile_group_fracmmvd_flag equal to 0 specifies that merge mode with motion vector difference in fractional-pel precision is disabled in the current tile group. When not present, the value of tile_group_fracmmvd_flag is inferred to be 1.}}

7.4.5.8 Merge data semantics mmvd_distance_idx[ x0 ][ y0 ] specifies the index used to derive MmvdDistance[ x0 ][ y0 ] as specified in Table 7-9. The array indices x0, y0 specify the location ( x0, y0 ) of the top-left luma sample of the considered coding block relative to the top-left luma sample of the picture.

TABLE 7-9

Specification of MmvdDistance[ x0 ][ y0 ]
based on mmvd_distance_idx[ x0 ][ y0 ].

| mmvd_distance_idx [ x0 ][ y0 ] | MmvdDistance [ x0 ][ y0 ] {{when tile_group_fracmmvd_flag is equal to 1}} | {{MmvdDistance [ x0 ][ y0 ] when tile_group_fracmmvd_flag is equal to 0}} |
|---|---|---|
| 0 | 1 | {{4}} |
| 1 | 2 | {{8}} |
| 2 | 4 | {{16}} |
| 3 | 8 | {{32}} |
| 4 | 16 | {{64}} |
| 5 | 32 | {{128}} |
| 6 | 64 | {{256}} |
| 7 | 128 | {{512}} |

1.1. Embodiment #6

The syntax change is described as follows, and the newly added parts are highlighted using {{}}.

7.3.2.1 Sequence parameter set RBSP syntax

|  | Descriptor |
|---|---|
| seq_parameter_set_rbsp( ) { |  |
| ... |  |
| sps_gbi_enabled_flag | u(1) |
| sps_mh_intra_enabled_flag | u(1) |
| {{sps_fracmmvd_disabled_flag}} | {{u(1)}} |
| sps_triangle_enabled_flag | u(1) |
| sps_ladf_enabled_flag | u(1) |
| if ( sps_ladf_enabled_flag ) { |  |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { |  |
|     sps_ladf_qp_offset[ i ] | se(v) |
|     sps_ladf_delta_threshold_minus1[ i ] | ue(v) |
|   } |  |
| } |  |
| rbsp_trailing_bits( ) |  |
| } |  |

7.3.3.1 General tile group header syntax

|  | Descriptor |
|---|---|
| tile_group_header( ) { |  |
| ... |  |
| if ( tile_group_type != I ) { |  |
|   if( sps_temporal_mvp_enabled_flag) |  |
|     tile_group_temporal_mvp_enabled_flag | u(1) |
|   if( tile_group_type = = B ) |  |
|     mvd_l1_zero_flag | u(1) |
|   if( tile_group_type = = B ) |  |
|     collocated_from_l0_flag | u(1) |
|   } |  |
|   six_minus_max_num_merge_cand | ue(v) |
|   if( sps_affine_enable_flag) |  |
|     five_minus_max_num_subblock_merge_cand | ue(v) |
|   {{if( sps_fracmmvd_disabled_flag )}} |  |
|     {{tile_group_fracmm vd_disabled_flag}} | u(1) |
| } |  |
| ... | se(v) |
| byte_alignment( ) |  |
| } |  |

7.4.3.1 Sequence parameter set RBSP semantics

{{sps_fracmmvd_disabled_flag equal to 1 specifies that disabling merge mode with motion vector difference in fractional-pel precision is applied. sps_fracmmvd_disabled_flag equal to 0 specifies that disabling merge mode with motion vector difference in fractional-pel precision is not applied.}}

7.4.4.1 General tile group header semantics

{{tile_group_fracmmvd_disabled_flag equal to 1 specifies that merge mode with motion vector difference in fractional-pel precision is disabled in the current tile group. tile_group_fracmmvd_disabled_flag equal to 0 specifies that merge mode with motion vector difference in fractional-pel precision is enabled in the current tile group. When not present, the value of tile_group_fracmmvd_disabled_flag is inferred to be 0.}}

7.4.5.8 Merge data semantics mmvd_distance_idx[ x0 ][ y0 ] specifies the index used to derive MmvdDistance[ x0 ][ y0 ] as specified in Table 7-9. The array indices x0, y0 specify the location ( x0, y0 ) of the top-left luma sample of the considered coding block relative to the top-left luma sample of the picture.

TABLE 7-9

Specification of MmvdDistance[ x0 ][ y0 ]
based on mmvd_distance_idx[ x0 ][ y0 ].

| mmvd_distance_idx [ x0 ][ y0 ] | MmvdDistance [ x0 ][ y0 ] {{when tile_group_fracmmvd_disabled_flag is equal to 0}} | {{MmvdDistance [ x0 ][ y0 ] when tile_group_fracmmvd_disabled_flag is equal to 1}} |
|---|---|---|
| 0 | 1 | {{4}} |
| 1 | 2 | {{8}} |
| 2 | 4 | {{16}} |
| 3 | 8 | {{32}} |
| 4 | 16 | {{64}} |
| 5 | 32 | {{128}} |
| 6 | 64 | {256}} |
| 7 | 128 | {{512}} |

1.2. Embodiment #7

The syntax change is described as follows, and the newly added parts are highlighted using {{}}.

7.3.2.1 Sequence parameter set RBSP syntax

|  | Descriptor |
|---|---|
| seq_parameter_set_rbsp( ) { |  |
| ... |  |
| sps_gbi_enabled_flag | u(1) |
| sps_mh_intra_enabled_flag | u(1) |
| {{sps_fracmmvd_disabled_flag}} | {{u(1)}} |
| sps_triangle_enabled_flag | u(1) |
| sps_ladf_enabled_flag | u(1) |
| if ( sps_ladf_enabled_flag ) { |  |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { |  |
|     sps_ladf_qp_offset[ i ] | se(v) |
|     sps_ladf_delta_threshold_minus1[ i ] | ue(v) |
|   } |  |
| } |  |
| rbsp_trailing_bits( ) |  |
| } |  |

7.3.3.1 General tile group header syntax

|  | Descriptor |
|---|---|
| tile_group_header( ) { | |
| ... | |
|   if (tile_group_type != I ) { | |
|     if( sps_temporal_mvp_enabled_flag ) | |
|       tile_group_temporal_mvp_enabled_flag | u(1) |
|     if( tile_group_type = = B ) | |
|       mvd_l1_zero_flag | u(1) |
|     if( tile_group_temporal_mvp_enabled_flag ) { | |
|       if( tile_group_type = = B ) | |
|         collocated_from_l0_flag | u(1) |
|     } | |
|     six_minus_max_num_merge_cand | ue(v) |
|     if( sps_affine_enable_flag) | |
|       five_minus_max_num_subblock_merge_cand | ue(v) |
|     {{if( sps_fracmmvd _disabled_flag )}} | |
|       {{tile_group_fracmmvd_flag}} | u(1) |
|   } | |
|   ... | se(v) |
|   byte_alignment( ) | |
| } | |

7.4.3.1 Sequence parameter set RBSP semantics

{{sps_fracmmvd_disabled_flag equal to 1 specifies that disabling merge mode with motion vector difference in fractional-pel precision is applied. sps_fracmmvd_disabled_flag equal to 0 specifies that disabling merge mode with motion vector difference in fractional-pel precision is not applied.}}

7.4.4.1 General tile group header semantics

{{tile_group_fracmmvd_flag equal to 1 specifies that merge mode with motion vector difference in fractional-pel precision is enabled in the current tile group. tile_group_fracmmvd_flag equal to 0 specifies that merge mode with motion vector difference in fractional-pel precision is disabled in the current tile group. When not present, the value of tile_group_fracmmvd_flag is inferred to be 1.}}

7.4.5.8 Merge data semantics mmvd_distance_idx[ x0 ][ y0 ] specifies the index used to derive MmvdDistance[ x0 ][ y0 ] as specified in Table 7-9. The array indices x0, y0 specify the location ( x0, y0 ) of the top-left luma sample of the considered coding block relative to the top-left luma sample of the picture.

TABLE 7-9

Specification of MmvdDistance[ x0 ][ y0 ] based on mmvd_distance_idx[ x0 ][ y0 ].

| mmvd_distance_idx [ x0 ][ y0 ] | MmvdDistance [ x0 ][ y0 ]{{when tile_group_fracmmvd_flag is equal to 1}} | {{MmvdDistance [ x0 ][ y0 ] when tile_group_fracmmvd_flag is equal to 0}} |
|---|---|---|
| 0 | 1 | {{4}} |
| 1 | 2 | {{8}} |
| 2 | 4 | {{16}} |
| 3 | 8 | {{32}} |
| 4 | 16 | {{64}} |
| 5 | 32 | {{128}} |
| 6 | 64 | {{256}} |
| 7 | 128 | {{512}} |

It should be noted for all embodiments, the related syntax may be put to other video data units (e.g., SPS/VPS/PPS/Picture header/slice header/tile group header etc. al).

Figure 11A:
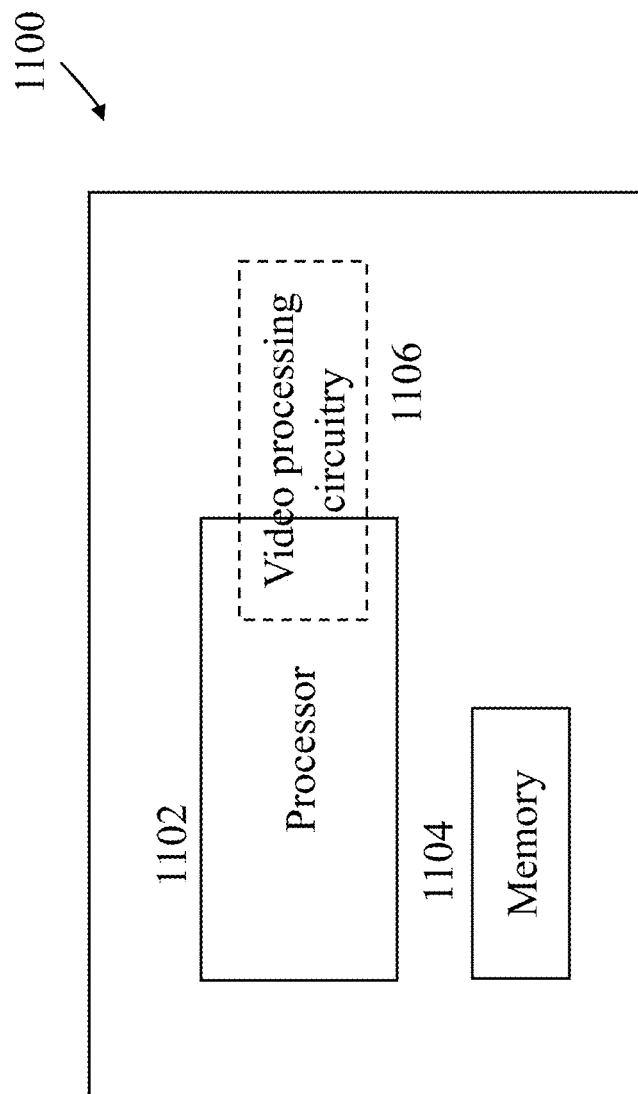
FIGS. 11A and 11B show examples of hardware platforms for implementing a technique described in the present document.

FIG. 11A is a block diagram of a video processing apparatus 1100. The apparatus 1100 may be used to implement one or more of the methods described herein. The apparatus 1100 may be embodied in a smartphone, tablet, computer, Internet of Things (IoT) receiver, and so on. The apparatus 1100 may include one or more processors 1102, one or more memories 1104 and video processing hardware 1106. The processor(s) 1102 may be configured to implement one or more methods described in the present document. The memory (memories) 1104 may be used for storing data and code used for implementing the methods and techniques described herein. The video processing hardware 1106 may be used to implement, in hardware circuitry, some techniques described in the present document, and may be partly or completely be a part of the processors 1102 (e.g., graphics processor core GPU or other signal processing circuitry).

Figure 11B:
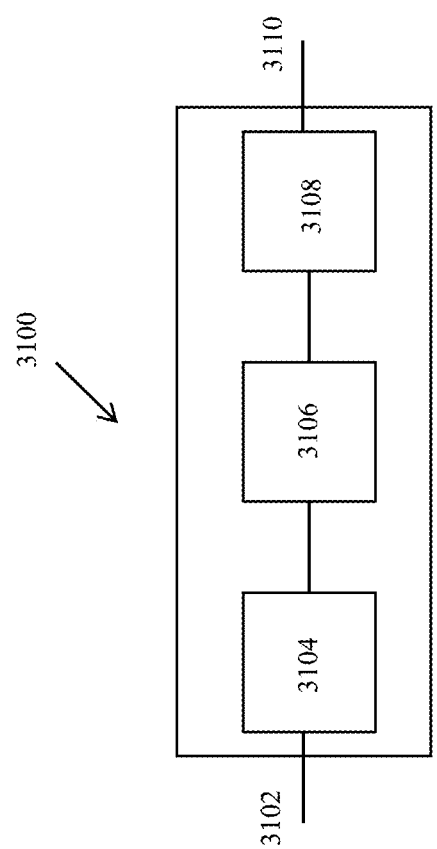

FIG. 11B is another example of a block diagram of a video processing system in which disclosed techniques may be implemented. FIG. 11B is a block diagram showing an example video processing system 3100 in which various techniques disclosed herein may be implemented. Various implementations may include some or all of the components of the system 3100. The system 3100 may include input 3102 for receiving video content. The video content may be received in a raw or uncompressed format, e.g., 8 or 10 bit multi-component pixel values, or may be in a compressed or encoded format. The input 3102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 3100 may include a coding component 3104 that may implement the various coding or encoding methods described in the present document. The coding component 3104 may reduce the average bitrate of video from the input 3102 to the output of the coding component 3104 to produce a coded representation of the video. The coding techniques are therefore sometimes called video compression or video transcoding techniques. The output of the coding component 3104 may be either stored, or transmitted via a communication connected, as represented by the component 3106. The stored or communicated bitstream (or coded) representation of the video received at the input 3102 may be used by the component 3108 for generating pixel values or displayable video that is sent to a display interface 3110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

In some embodiments, the video coding methods may be implemented using an apparatus that is implemented on a hardware platform as described with respect to FIG. 11A or 11B.

Figure 12:
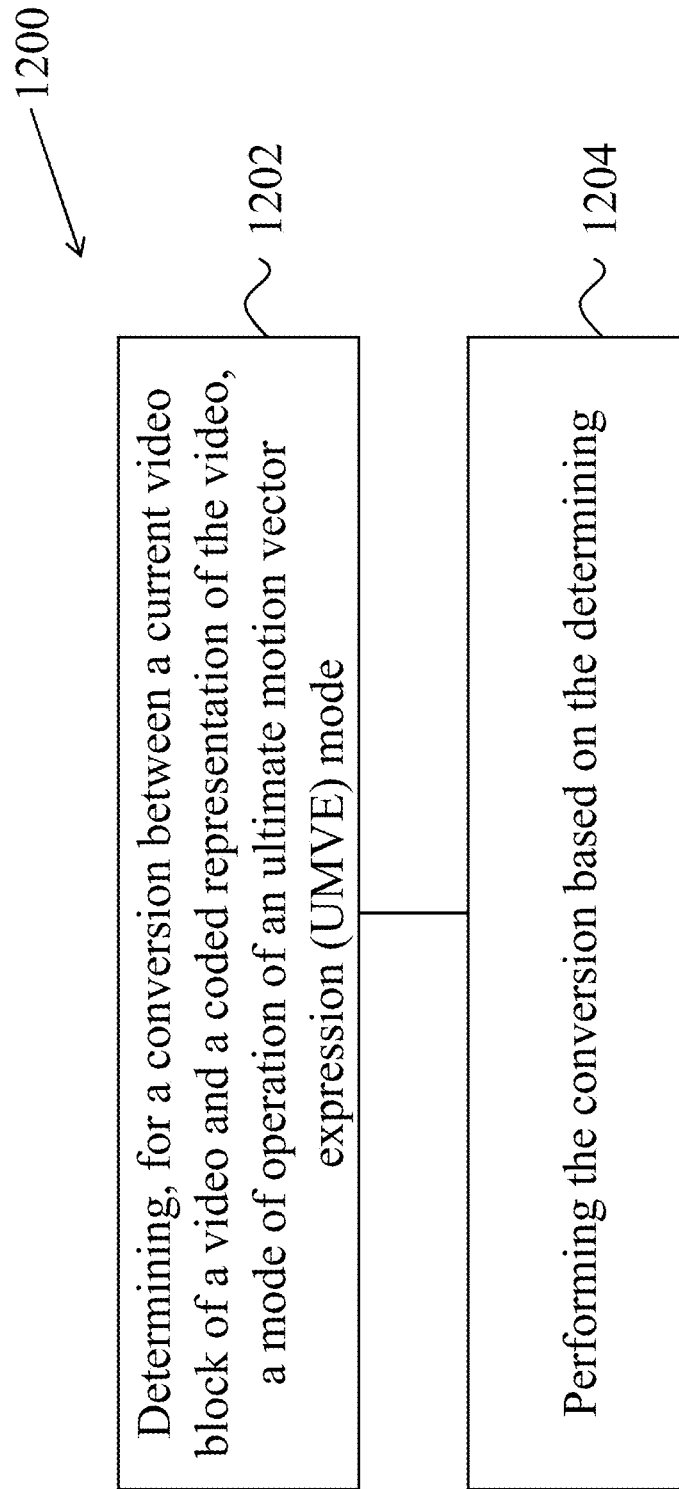
FIGS. 12-14 show flowcharts for example methods of video processing based on some implementations of the disclosed technology

FIG. 12 shows a flowchart of an example method for video processing based on some implementations of the disclosed technology. The method 1200 includes, at step 1202, determining, for a conversion between a current video block of a video and a coded representation of the video, a mode of operation of an ultimate motion vector expression (UMVE) mode. The method 1200 includes, at step 1204, performing the conversion based on the determining. In some implementations, the current video block is coded with a merge mode and motion vector differences in an UMVE mode that comprises a motion vector expression that includes a starting point of motion information, a motion magnitude and a motion direction for the current video block, wherein one or more fields in the coded representation correspond to the mode of operation and wherein the one or more fields include: an UMVE enable field whose value indicates whether the UMVE mode is enabled or disabled for the current video block, or a modified affine mode enable field that indicates whether an affine merge mode modified based on the UMVE mode is enabled or disabled for the current video block. In some implementations, the current video block is coded with a merge mode and motion vector differences in an UMVE mode that comprises a motion vector expression that includes a starting point of motion information, a motion magnitude and a motion direction for the current video block, wherein one or more fields in the coded representation correspond to the mode of operation, and wherein the one or more fields include: a list size field that indicates a size of a base candidate list used by the UMVE mode, or a table field that signals a distance table or a direction table for the UMVE mode.

Figure 13:
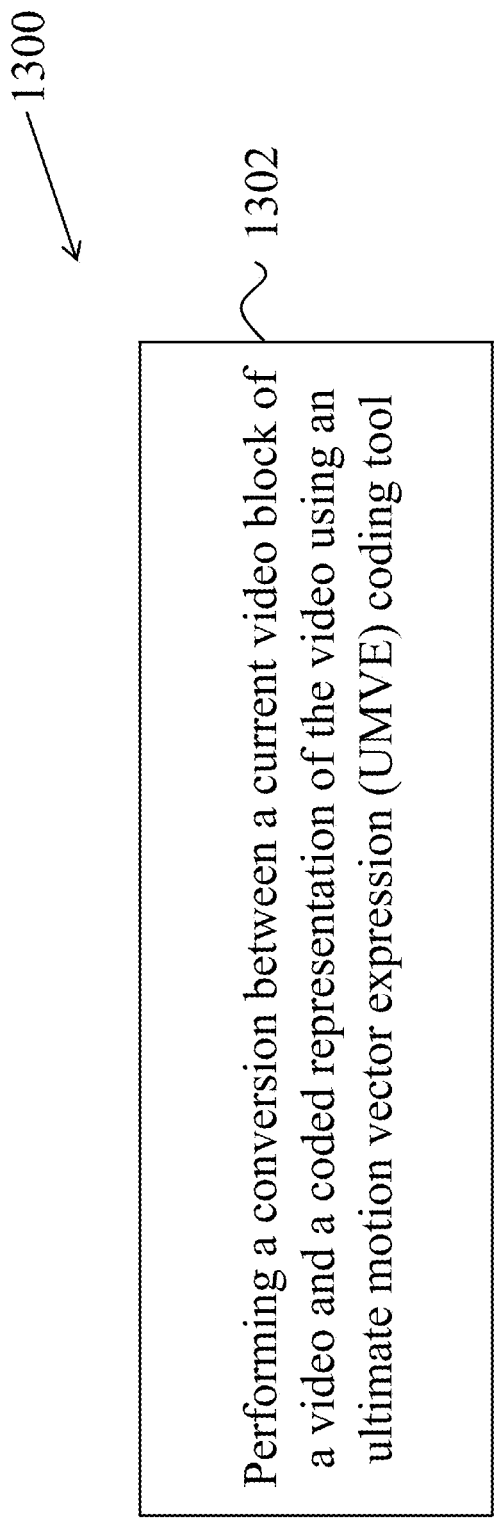

FIG. 13 shows a flowchart of an example method for video processing based on some implementations of the disclosed technology. The method 1300 includes, at step 1302, performing a conversion between a current video block of a video and a coded representation of the video using an ultimate motion vector expression (UMVE) coding tool. In some implementations, the UMVE coding tool represents a motion vector expression that includes a starting point of motion information, a motion magnitude and a motion direction for the current video block, and wherein at least one of a distance table or a direction table depends on a picture order count (POC) of two reference pictures or a POC of a current picture that includes the current video block, or a quantization parameter (QP) used for coding the current video block, a current slice, or the current picture. In some implementations, the UMVE coding tool represents a motion vector expression that includes a starting point of motion information, a motion magnitude and a motion direction for the current video block, wherein an adaptive motion vector resolution (AMVR) scheme is used to signal distance tables used by the UMVE coding tool.

Figure 14:
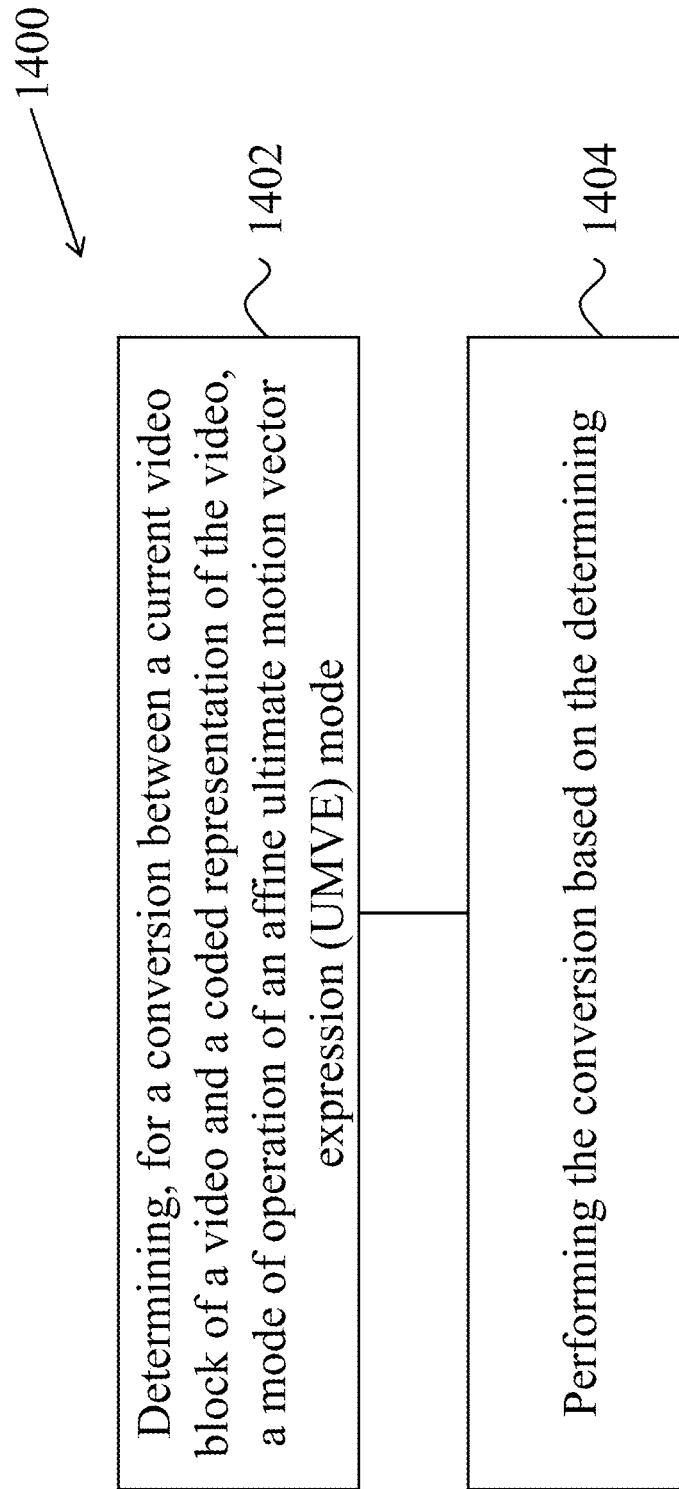

FIG. 14 shows a flowchart of an example method for video processing based on some implementations of the disclosed technology. The method 1400 includes, at step 1402, determining, for a conversion between a current video block of a video and a coded representation of the video, a mode of operation of an affine ultimate motion vector expression (UMVE) mode. The method 1400 includes, at step 1404, performing the conversion based on the determining.

Figure 15A:
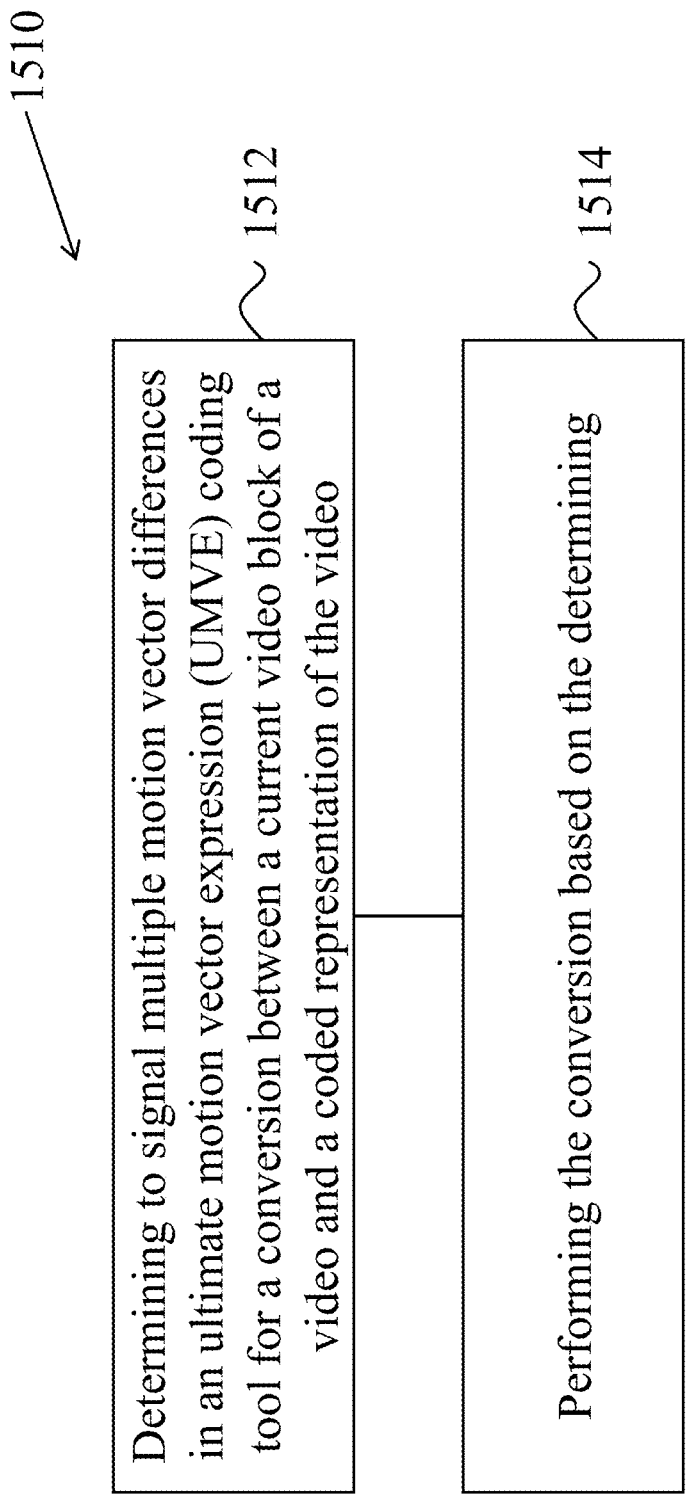

FIG. 15A shows a flowchart of an example method for video processing based on some implementations of the disclosed technology. The method 1510 includes, at step 1512, determining to signal multiple motion vector differences in an ultimate motion vector expression (UMVE) coding tool for a conversion between a current video block of a video and a coded representation of the video. The method 1510 includes, at step 1514, performing the conversion based on the determining. In some implementations, using the UMVE coding tool, a motion vector expression that includes a starting point, N motion vector differences represented by N motion magnitudes and N motion directions of the current video block is used during the conversion, N being an integer equal to or greater than two.

Figure 15B:
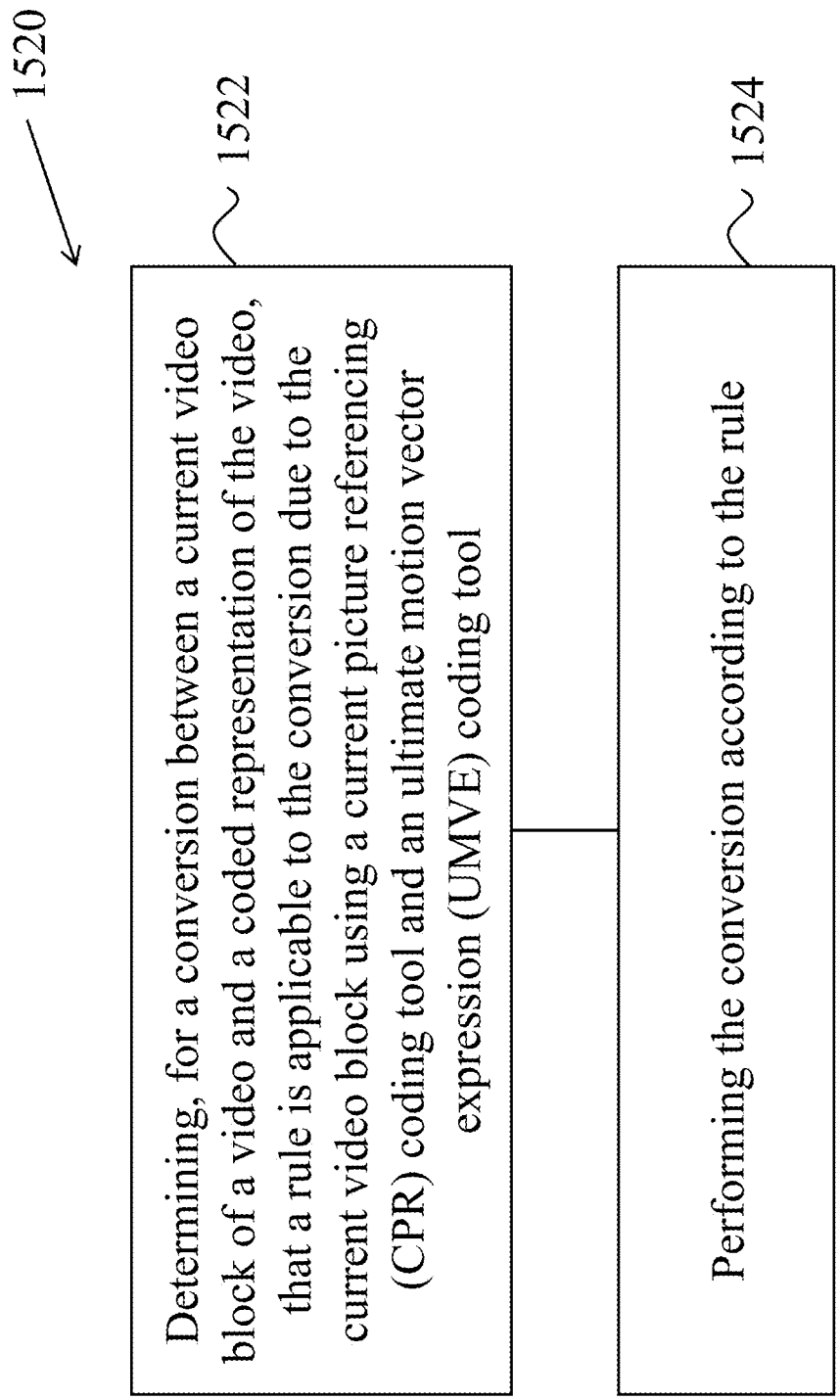

FIG. 15B shows a flowchart of an example method for video processing based on some implementations of the disclosed technology. The method 1520 includes, at step 1522, determining, for a conversion between a current video block of a video and a coded representation of the video, that a rule is applicable to the conversion due to the current video block using a current picture referencing (CPR) coding tool and an ultimate motion vector expression (UMVE) coding tool. The method 1520 includes, at step 1524, performing the conversion according to the rule. In some implementations, the rule disallows use of one or more coding distances for the conversion, wherein the CPR coding tool uses a current picture as a reference picture, and the UMVE coding tool uses a motion vector expression that includes a starting point, a motion magnitude and a motion direction for the current video block.

FIG. 15C shows a flowchart of an example method for video processing based on some implementations of the disclosed technology. The method 1530 includes, at step 1532, determining, during a conversion between a current video block of a video and a coded representation of the video, to perform refinement of a motion vector difference (MVD) value for the current video block upon determining that the current video block uses an ultimate motion vector expression (UMVE) coding tool that represents a motion vector expression that includes a starting point, a motion magnitude and a motion direction for the current video block. The method 1530 includes, at step 1534, performing the conversion based on the determining.

FIG. 15D shows a flowchart of an example method for video processing based on some implementations of the disclosed technology. The method 1540 includes, at step 1542, determining, for a conversion between a current video block of a video and a coded representation of the video, to use a first ultimate motion vector expression (UMVE) parameter set from multiple UMVE parameter sets upon determining that the current video block uses an UMVE coding tool that represents a motion vector expression that includes a starting point, a motion magnitude and a motion direction for the current video block. The method 1540 includes, at step 1544, performing the conversion based on the determining. In some implementations, an indication of at least one of the multiple UMVE parameter sets is signaled or predefined for the current video block.

Figure 15E:
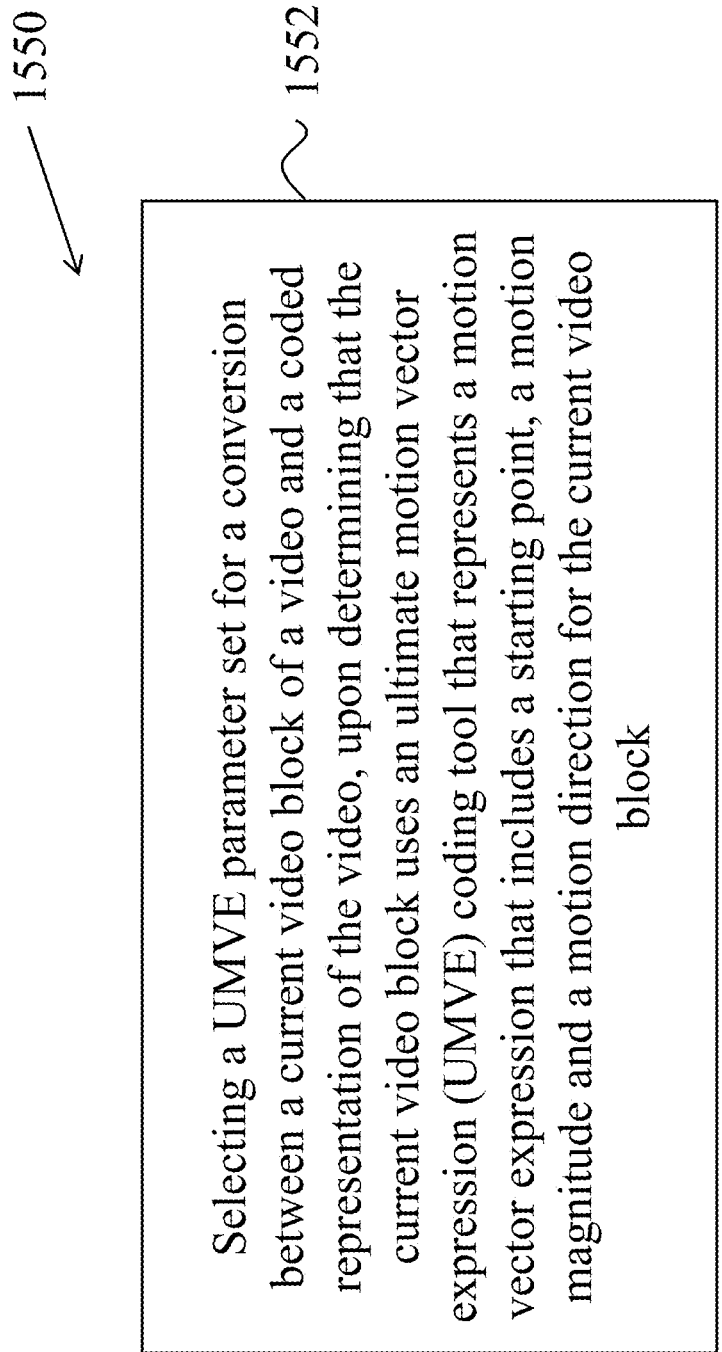

FIG. 15E shows a flowchart of an example method for video processing based on some implementations of the disclosed technology. The method 1550 includes, at step 1552, selecting a UMVE parameter set for a conversion between a current video block of a video and a coded representation of the video, upon determining that the current video block uses an ultimate motion vector expression (UMVE) coding tool that represents a motion vector expression that includes a starting point, a motion magnitude and a motion direction for the current video block. In some implementations, the selected UMVE parameter set is changed across different video blocks, different reference picture lists, different reference pictures, different tiles, different slices, different pictures, or different temporal layers.

Figure 16A:
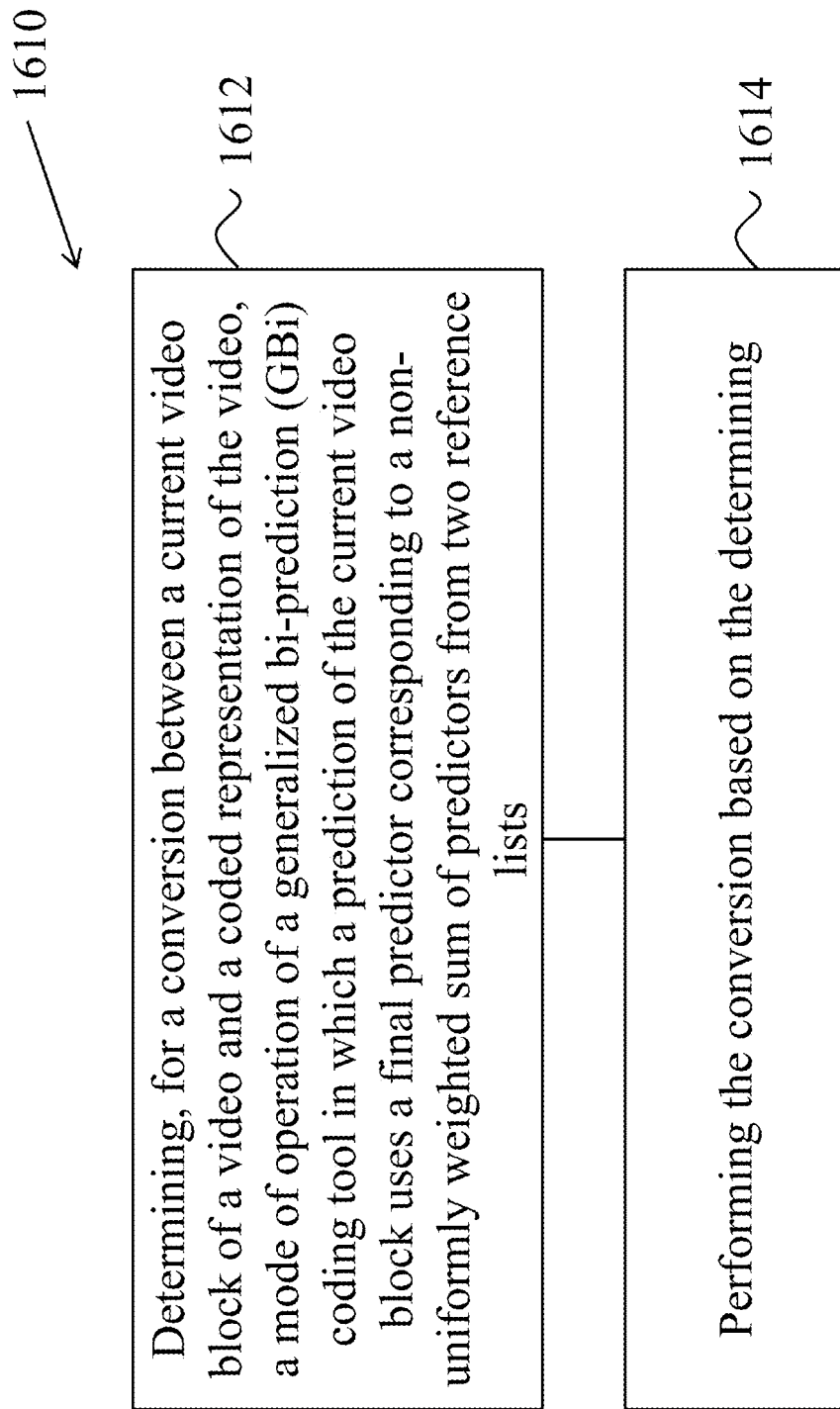
FIGS. 16A-16C show flowcharts for example methods of video processing based on some implementations of the disclosed technology.

FIG. 16A shows a flowchart of an example method for video processing based on some implementations of the disclosed technology. The method 1610 includes, at step 1612, determining, for a conversion between a current video block of a video and a coded representation of the video, a mode of operation of a generalized bi-prediction (GBi) coding tool in which a prediction of the current video block uses a final predictor corresponding to a non-uniformly weighted sum of predictors from two reference lists. The method 1610 includes, at step 1614, performing the conversion based on the determining. In some implementations, a field in the coded representation corresponds to the mode of operation and a value of the field indicates whether the GBI coding tool is enabled or disabled for the current video block.

Figure 16B:
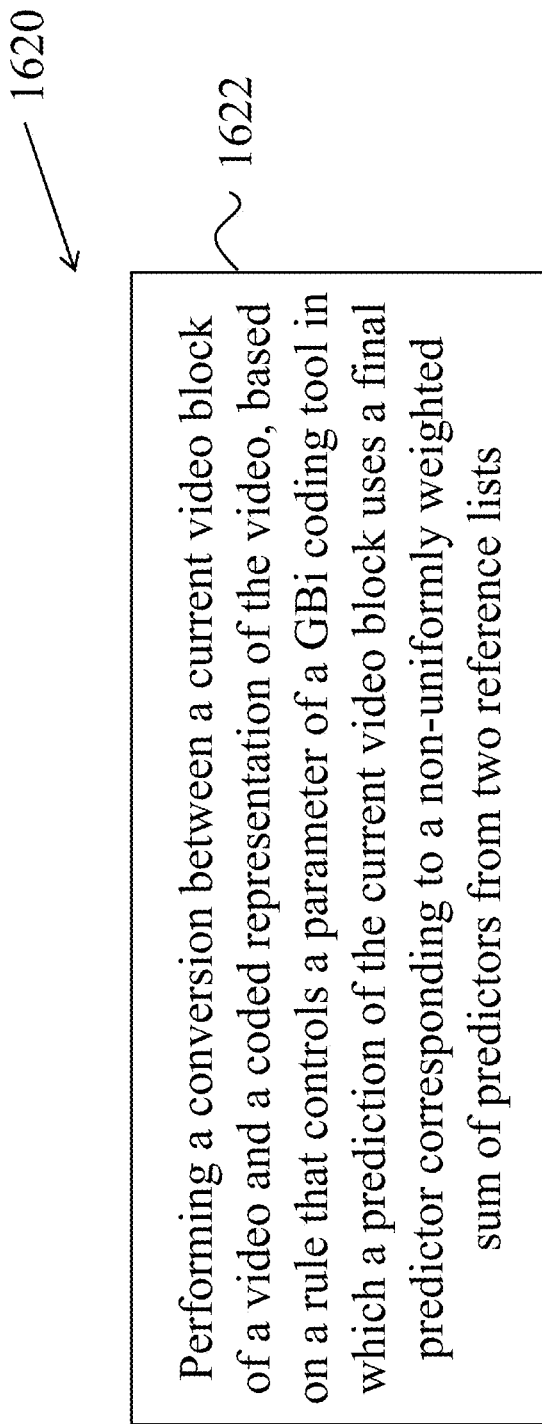

FIG. 16B shows a flowchart of an example method for video processing based on some implementations of the disclosed technology. The method 1620 includes, at step 1622, performing a conversion between a current video block of a video and a coded representation of the video, based on a rule that controls a parameter of a GBi coding tool in which a prediction of the current video block uses a final predictor corresponding to a non-uniformly weighted sum of predictors from two reference lists. In some implementations, the rule specifies that a weighting factor set used by the GBi coding tool is based on i) a temporal layer of a picture including the current video block, ii) a picture quantization parameter of the picture, or iii) a quantization parameter of the current video block. In some implementations, the rule specifies to select or derive a weighting factor for the GBi coding tool based on neighboring pixels of the current video block and corresponding reference neighboring pixels identified by motion vectors or integer part of the motion vectors of the current video block. In some implementations, the rule specifies to reorder weighting factors for the GBi coding tool based on neighboring pixels of the current video block and corresponding reference neighboring pixels identified by motion vectors or integer part of the motion vectors of the current video block. In some implementations, a rule specifies to use local illumination compensation (LIC) parameters associated with the current video block for determining a weighting factor for the GBi coding tool, and wherein the LIC parameters are derived to use a linear model of illumination changes in the current block during the conversion.

Figure 16C:
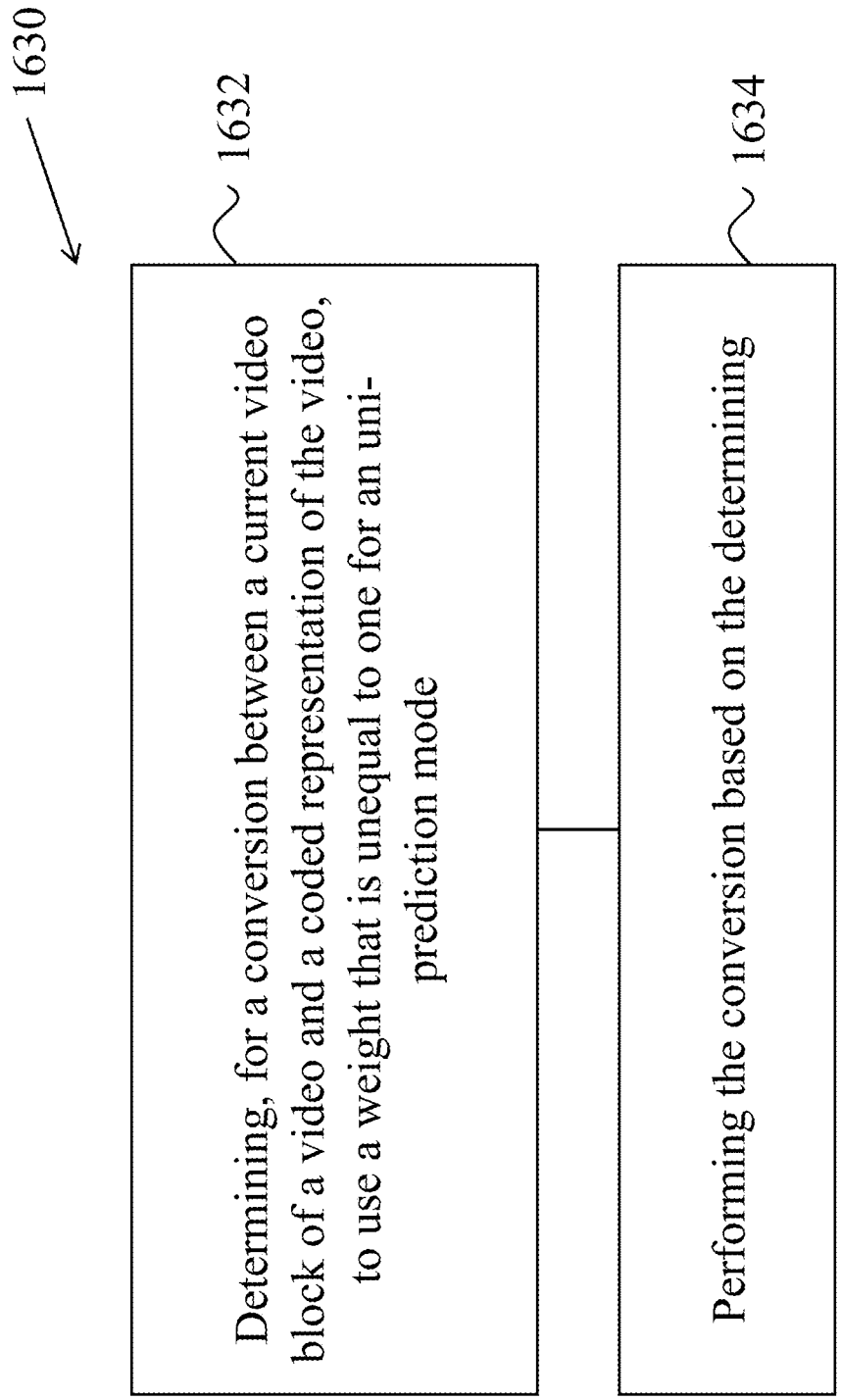

FIG. 16C shows a flowchart of an example method for video processing based on some implementations of the disclosed technology. The method 1630 includes, at step 1632, determining, for a conversion between a current video block of a video and a coded representation of the video, to use a weight that is unequal to one for an uni-prediction mode. The method 1630 includes, at step 1634, performing the conversion based on the determining. In some implementations, a prediction of the current video block uses a final predictor corresponding to predictors scaled by the weight, and wherein a weighting factor set is selected at a block level or a coding unit level.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that several techniques have been disclosed that will benefit video encoder and decoder embodiments incorporated within video processing devices such as smartphones, laptops, desktops, and similar devices by allowing the use of virtual motion candidates that are constructed based on various rules disclosed in the present document.

Various techniques and embodiments may be described using the following clause-based format.

The first set of clauses describes certain features and aspects of the disclosed techniques listed in the previous section, including, for example, item 1.

1. A method of video processing, comprising: determining, for a conversion between a current video block of a video and a coded representation of the video, a mode of operation of an ultimate motion vector expression (UMVE) mode; and performing the conversion based on the determining, wherein the current video block is coded with a merge mode and motion vector differences in an UMVE mode that comprises a motion vector expression that includes a starting point of motion information, a motion magnitude and a motion direction for the current video block, and wherein one or more fields in the coded representation correspond to the mode of operation, and wherein the one or more fields include: an UMVE enable field whose value indicates whether the UMVE mode is enabled or disabled for the current video block, or a modified affine mode enable field that indicates whether an affine merge mode modified based on the UMVE mode is enabled or disabled for the current video block.

2. The method of clause 1, wherein the starting point is indicated by an index to a base merge candidate list and final motion information of the current video block is dependent on the motion vector differences represented by the motion direction and the motion magnitude.

3. The method of clause 1, wherein the one or more fields are included at a slice header level.

4. The method of clause 1, wherein the one or more field are included at a tile group header level.

5. The method of clause 1, wherein the one or more field are included at a tile header level.

6. The method of clause 1, wherein the one or more field are included at a picture header level.

7. The method of clause 1, wherein the one or more field are included at a picture parameter set level.

8. The method of clause 1, wherein the one or more field are included at a sequence parameter set level.

9. The method of clause 1, wherein the one or more field are included at a video parameter set level.

10. The method of any of clauses 1-9, wherein the performing of the conversion includes generating the coded representation from the current block.

11. The method of any of clauses 1-9, wherein the performing of the conversion includes generating the current block from the coded representation.

12. An apparatus in a video system comprising a processor and a non-transitory memory with instructions thereon, wherein the instructions upon execution by the processor, cause the processor to implement the method in any one of clauses 1 to 11.

13. A computer program product stored on a non-transitory computer readable media, the computer program product including program code for carrying out the method in any one of clauses 1 to 11.

The second set of clauses describes certain features and aspects of the disclosed techniques listed in the previous section, including, for example, items 2, 4, and 9.

1. A method of video processing, comprising:
determining, for a conversion between a current video block of a video and a coded representation of the video, a mode of operation of an ultimate motion vector expression (UMVE) mode; and performing the conversion based on the determining, wherein the current video block is coded with a merge mode and motion vector differences in an UMVE mode that comprises a motion vector expression that includes a starting point of motion information, a motion magnitude and a motion direction for the current video block, and wherein one or more fields in the coded representation correspond to the mode of operation, and wherein the one or more fields include: a list size field that indicates a size of a base candidate list used by the UMVE mode, or a table field that signals a distance table or a direction table for the UMVE mode.

2. The method of clause 1, wherein the starting point is indicated by an index to a base merge candidate list and final motion information of the current block is dependent on the motion vector differences.

3. The method of clause 1, wherein the one or more fields are included at a slice header level, a tile group header level, a tile header level, a picture header level, a picture parameter set level, a sequence parameter set level, or a video parameter set level.

4. The method of clause 1, wherein the size of the base candidate list is set to 1, 2, or 3.

5. The method of clause 1, wherein the one or more fields further includes a merge mode list size field whose value indicates a size of a candidate list for a merge mode.

6. The method of clause 5, wherein the size of the base candidate list used by the UMVE mode is less than or equal to the size of the candidate list for the merge mode.

7. The method of clause 5, wherein the list size field is omitted from the coded representation.

8. The method of clause 7, wherein the size of the base candidate list used by the UMVE mode is equal to the size of the candidate list for the merge mode.

9. The method of clause 1, wherein the table field signals a size K1 of the distance table, and a size K2 of the direction table.

10. The method of clause 9, wherein first K1 elements of the distance table or first K2 elements of the direction table are valid.

11. The method of clause 9, wherein last K1 elements of the distance table or last K2 elements of the direction table are valid.

12. A method of video processing, comprising: performing a conversion between a current video block of a video and a coded representation of the video using an ultimate motion vector expression (UMVE) coding tool, wherein the UMVE coding tool represents a motion vector expression that includes a starting point of motion information, a motion magnitude and a motion direction for the current video block, and wherein at least one of a distance table or a direction table depends on a picture order count (POC) of two reference pictures or a POC of a current picture that includes the current video block, or a quantization parameter (QP) used for coding the current video block, a current slice, or the current picture.

13. The method of clause 12, wherein the distance table and the direction table depend on a difference between the POC of the two reference pictures and the POC of the current picture.

14. The method of any of clauses 1-13, wherein the performing of the conversion includes generating the coded representation from the current block.

15. The method of any of clauses 1-13, wherein the performing of the conversion includes generating the current block from the coded representation.

16. An apparatus in a video system comprising a processor and a non-transitory memory with instructions thereon, wherein the instructions upon execution by the processor, cause the processor to implement the method in any one of clauses 1 to 15.

17. A computer program product stored on a non-transitory computer readable media, the computer program product including program code for carrying out the method in any one of clauses 1 to 15.

The third set of clauses describes certain features and aspects of the disclosed techniques listed in the previous section, including, for example, items 3 and 7.

1. A method of video processing, comprising: determining, for a conversion between a current video block of a video and a coded representation of the video, a mode of operation of an affine ultimate motion vector expression (UMVE) mode; and performing the conversion based on the determining, wherein the current video block is coded with an affine merge mode and motion vector differences in an affine UMVE mode that includes a starting point of motion information, a motion magnitude and a motion direction for the current video block, and wherein one or more fields in the coded representation correspond to the mode of operation, and wherein the one or more fields include: a list size field that indicates a size of a base affine merge candidate list for an affine merge mode with prediction offsets that is used by the UMVE mode, or a table field that signals a distance table or a direction table for the affine merge mode with prediction offset.

2. The method of clause 1, wherein the starting point is indicated by an index to a base affine merge candidate list and final motion information is dependent on the motion vector differences represented by the motion direction and the motion magnitude.

3. The method of clause 1, wherein the one or more fields are included at a slice header level, a tile group header level, a tile header level, a picture header level, a picture parameter set level, a sequence parameter set level, or a video parameter set level.

4. The method of clause 1, wherein the size of the base affine merge candidate list is set to 1, 2, or 3.

5. The method of clause 1, wherein the one or more fields further includes a sub-block merge list size field whose value indicates a size of a candidate list for a sub-block merge mode.

6. The method of clause 5, wherein the size of the base affine merge candidate list for the affine UMVE mode is less than or equal to the size of the candidate list for the sub-block merge mode.

7. The method of clause 5, wherein the list size field is omitted from the coded representation.

8. The method of clause 7, wherein the size of the base affine merge candidate list for the affine UMVE mode is equal to the size of the candidate list for the sub-block merge mode.

9. The method of clause 1, wherein the affine UMVE mode corresponds to an affine merge mode modified based on the UMVE mode.

10. The method of any of clause 1, wherein the table field signals a size K1 of the distance table, and a size K2 of the direction table.

11. The method of clause 10, wherein first K1 elements of the distance table or first K2 elements of the direction table are valid.

12. The method of clause 10, wherein last K1 elements of the distance table or last K2 elements of the direction table are valid.

13. The method of any of clauses 1-12, wherein the performing of the conversion includes generating the coded representation from the current block.

14. The method of any of clauses 1-12, wherein the performing of the conversion includes generating the current block from the coded representation.

15. An apparatus in a video system comprising a processor and a non-transitory memory with instructions thereon, wherein the instructions upon execution by the processor, cause the processor to implement the method in any one of clauses 1 to 14.

16. A computer program product stored on a non-transitory computer readable media, the computer program product including program code for carrying out the method in any one of clauses 1 to 14.

The fourth set of clauses describes certain features and aspects of the disclosed techniques listed in the previous section, including, for example, items 8, 10, 11, 12, 13, 14. 15, and 16.

1. A method of video processing, comprising: determining to signal multiple motion vector differences in an ultimate motion vector expression (UMVE) coding tool for a conversion between a current video block of a video and a coded representation of the video; and performing the conversion based on the determining, wherein, using the UMVE coding tool, a motion vector expression that includes a starting point, N motion vector differences represented by N motion magnitudes and N motion directions of the current video block is used during the conversion, N being an integer equal to or greater than two.

2. The method of clause 1, wherein N is two and two motion vector differences correspond to two prediction directions in bi-directional prediction.

3. The method of clause 2, wherein the number of MVDs used in the UMVE coding tool is signaled.

4. The method of clause 2, wherein the number of MVDs used in the UMVE coding tool is derived.

5. The method of clause 1, wherein one MVD is encoded for each prediction direction and a first MVD of a first direction is used to predict a second MVD of a second direction.

6. The method of clause 5, wherein a MVD for a first prediction direction is signaled earlier than other MVDs.

7. The method of clause 6, wherein a MVD for a second prediction direction is signaled earlier than other MVDs.

8. The method of clause 1, wherein an order of signaling N motion vector differences is signaled.

9. The method of clause 1, wherein at least one of a base candidate index, a distance index, or a direction index is signaled for each prediction direction.

10. A method of video processing, comprising: determining, for a conversion between a current video block of a video and a coded representation of the video, that a rule is applicable to the conversion due to the current video block using a current picture referencing (CPR) coding tool and an ultimate motion vector expression (UMVE) coding tool; and performing the conversion according to the rule, wherein the rule disallows use of one or more coding distances for the conversion, wherein the CPR coding tool uses a current picture as a reference picture, and wherein the UMVE coding tool uses a motion vector expression that includes a starting point, a motion magnitude and a motion direction for the current video block.

11. The method of clause 10, wherein the rule specifies that a distance with fractional pixel precision that includes 1/2 pixel resolution or 1/4 pixel resolution is disallowed.

12. The method of clause 10, wherein the rule specifies that a distance that is out of a valid search range in a CPR mode is disallowed.

13. The method of clause 10, wherein the certain distance is replaced with a valid distance.

14. The method of clause 10, wherein different sets of mapping between distance indices and pixel distances are defined for a CPR mode and a non-CPR mode.

15. The method of clause 14, wherein a predefined delta motion vector is added to a starting point of the UMVE coding tool.

16. The method of clause 15, wherein the predefined delta motion vector depends on at least one of a block size, a reference index, or a color component.

17. The method of clause 15, wherein the predefined delta motion vector depends is signaled in a slice header level, a tile group header level, a tile header level, a picture header level, a picture parameter set level, a sequence parameter set level, a video parameter set level, or a coding unit level.

18. The method of clause 10, wherein a uni-prediction is always applied when the UMVE coding tool is used together with the CPR coding tool.

19. The method of clause 18, wherein only one MVD is used or signaled.

20. The method of clause 10, wherein a base merge candidate has at least one reference picture that is a current picture, a certain direction index is disallowed.

21. The method of clause 10, wherein the UMVE coding tool is applied in a case that a merge candidate or an AMVP candidate has at least one reference picture that is a current picture.

22. A method of video processing, comprising: determining, during a conversion between a current video block of a video and a coded representation of the video, to perform refinement of a motion vector difference (MVD) value for the current video block upon determining that the current video block uses an ultimate motion vector expression (UMVE) coding tool that represents a motion vector expression that includes a starting point, a motion magnitude and a motion direction for the current video block; and performing the conversion based on the determining.

23. The method of clause 22, wherein the refinement is performed using a decoded distance index and/or a decoded direction index for the current video block.

24. The method of clause 22, wherein the refining operation is based on motion information associated with one or more merge candidates in a merge candidate list for the current video block.

25. The method of clause 18, wherein a selected base candidate plus a decoded MVD is identical to another merge candidate, the decoded MVD is further refined.

26. The method of clause 18, wherein the decoded MVD is further refined in a case that a selected base candidate plus a decoded MVD is determined based on a rule to be similar to another merge candidate.

27. The method of clause 20, wherein the rule determines that two motion vectors of MV1 and MV2 are similar in a case that $|MV1x-MV2x|+|MV1y-MV2y|<T$, wherein MV1x and MV2x are horizontal components of MV1 and MV2 and MV2x and MV2y are vertical components of MV1 and MV2.

28. The method of clause 26, wherein the rule determines that two candidates are similar in a case that the two candidates share same reference indices and two motion vectors referring to a same reference picture are similar.

29. The method of clause 24, wherein the decoded distance index and the decoded direction index change from the current video block to a next video block.

30. The method of clause 22, wherein a bi-directional optical flow (BIO) is disallowed in the current video block coded with the UMVE coding tool.

31. The method of clause 22, wherein a decoder-side motion vector refinement (DMVR) is disallowed in the current video block coded with the UMVE coding tool.

32. The method of any of clauses 1-31, wherein the UMVE coding tool comprises a mapping between a coded base candidate index and a candidate index in a merge candidate list for the current video block and the mapping is changed across different video blocks, different tiles, or different pictures of different video sequences.

33. The method of clause 32, wherein a first coded base candidate index that is equal to 0 always corresponds to a first merge candidate in the merge candidate list.

34. The method of clause 33, wherein a Kth coded base candidate index that is equal to K does not correspond to (K+1)th merge candidate in the merge candidate list, K being an integer greater than 0.

35. The method of clause 33, wherein a second coded base candidate index that is equal to 1 indicates a merge candidate in the merge candidate list and the merge candidate is not similar to the first merge candidate to which the first coded base candidate index points.

36. The method of clause 32, wherein the mapping or a selection of a base merge candidate from the merge candidate list depends on a first merge candidate in the merge candidate list.

37. The method of clause 32, wherein certain merge candidates are disallowed as a base merge candidate for the current video block.

38. The method of clause 37, wherein the certain merge candidates include at least one of followings: i) virtual merge candidates including combined bi-prediction merge candidates, pairwise merge candidates, zero motion vector merge candidates), ii) temporal merge candidates, iii) HMVP candidates, or iv) a merge candidate derived from a certain mode including a triangular prediction mode, a sub-block mode, an affine mode, ATMVP, or STMVP.

39. The method of clause 32, wherein at least one base merge candidate used by the UMVE coding tool is not from the merge candidate list.

40. The method of clause 32, wherein a first merge candidate in the merge candidate list is restricted to a first candidate that is non-current picture-referenced candidate.

41. The method of clause 32, wherein base merge candidates in the merge candidate list, the merge candidates are different from one another by a threshold.

42. A method of video processing, comprising: determining, for a conversion between a current video block of a video and a coded representation of the video, to use a first ultimate motion vector expression (UMVE) parameter set from multiple UMVE parameter sets upon determining that the current video block uses an UMVE coding tool that represents a motion vector expression that includes a starting point, a motion magnitude and a motion direction for the current video block; and performing the conversion based on the determining, wherein an indication of at least one of the multiple UMVE parameter sets is signaled or predefined for the current video block.

43. The method of clause 42, wherein the indication is signaled or predefined in a slice header level, a tile group header level, a tile header level, a picture header level, a picture parameter set level, a sequence parameter set level, a video parameter set level, or a coding unit level.

44. The method of clause 42, wherein the coded representation comprises each of the multiple UMVE parameter sets.

45. The method of clause 42, wherein the coded representation includes one set of distance tables and/or direction tables.

46. The method of clause 45, wherein the coded representation includes an indication of how to shift available distance values at a slice header level, a tile group header level, a tile header level, a picture header level, a picture parameter set level, a sequence parameter set level, or a video parameter set level.

47. The method of clause 46, wherein the indication indicates whether to use the signaled distance tables, whether to left shift distance values by an integer M, or whether to right shift distance values by an integer N.

48. The method of clause 42, wherein parameters for the UMVE coding tool are selected based on a size of the current video block.

49. The method of clause 48, wherein the size corresponds to at least one of i) a width of the current video block, ii) a height of the current video block, or iii) a total number of pixel positions of the current video block.

50. The method of clause 42, wherein the first UMVE parameter set is selected based on a coding mode of the current video block.

51. The method of clause 42, wherein the first UMVE parameter set is selected based on a resolution of a current picture or a current sequence that comprises the current video block.

52. The method of clause 42, wherein the first UMVE parameter set is selected based on a selected base merge candidate.

53. The method of clause 52, wherein the first UMVE parameter set is selected based on at least one of a motion vector magnitude or a sign value.

54. The method of clause 52, wherein the first UMVE parameter set is selected based on a reference picture, POC values of the reference pictures of the selected base merge candidate.

55. The method of clause 52, wherein the first UMVE parameter set is selected based on whether a motion vector of the selected base merge candidate points to an integer position or a sub-position.

56. The method of clause 52, wherein the first UMVE parameter set is selected based on a category of a merge candidate denoted by the selected base merge candidate, the category being one of spatial, temporal, or HMVP (history-based MVP).

57. The method of clause 52, wherein the first UMVE parameter set is selected based on a location where a merge candidate denoted by the selected base merge candidate is derived from.

58. The method of clause 52, wherein the first UMVE parameter set is selected based on an index of a merge candidate denoted by the selected base merge candidate.

59. The method of clause 42, wherein each of the multiple UMVE parameter sets is associated with a predetermined motion vector precision.

60. The method of clause 59, wherein the number of the multiple UMVE parameter sets depends on how many motion vector precisions are allowed for one sequence, view, picture, slice, tile, or a video data processing unit.

61. The method of clause 59, wherein for a base merge candidate derived from the current video block, an associated AMVR (adaptive motion vector resolution) index is inherited to decide the first UMVE parameter set.

62. A method of video processing, comprising: selecting a UMVE parameter set for a conversion between a current video block of a video and a coded representation of the video, upon determining that the current video block uses an ultimate motion vector expression (UMVE) coding tool that represents a motion vector expression that includes a starting point, a motion magnitude and a motion direction for the current video block, wherein the selected UMVE parameter set is changed across different video blocks, different reference picture lists, different reference pictures, different tiles, different slices, different pictures, or different temporal layers.

63. The method of clause 62, wherein the selecting of the UMVE parameter set depends on a horizontal component or a vertical component of the base motion vector.

64. The method of any of clauses 42-63, wherein each UMVE parameter set or the selected UMVE parameter set includes at least one of distance tables, direction tables, or other representations of the UMVE coding tool.

65. A method of video processing, comprising: performing a conversion between a current video block of a video and a coded representation of the video using an ultimate motion vector expression (UMVE) coding tool that represents a motion vector expression that includes a starting point, a motion magnitude and a motion direction for the current video block, wherein an adaptive motion vector resolution (AMVR) scheme is used to signal distance tables used by the UMVE coding tool.

66. The method of clause 65, wherein an indication whether to scale MV precisions defined in an AMVR precision set is signaled in a slice header level, a tile group header level, a tile header level, a picture header level, a picture parameter set level, a sequence parameter set level, a video parameter set level, or a coding unit level.

67. The method of clause 65, wherein multiple sets of AMVR precisions are defined or signaled.

68. The method of clause 65, wherein indications of set index are signaled or derived using coding information of the current video block or a previous video block.

69. The method of clause 65, wherein allowed AMVR prevision sets are changed between different video units.

70. The method of clause 65, wherein a mapping between a signaled MV precision index and an actual MV precision used is changed between different video units.

71. The method of any of clauses 1-70, wherein the performing of the conversion includes generating the coded representation from the current block.

72. The method of any of clauses 1-70, wherein the performing of the conversion includes generating the current block from the coded representation.

73. An apparatus in a video system comprising a processor and a non-transitory memory with instructions thereon, wherein the instructions upon execution by the processor, cause the processor to implement the method in any one of clauses 1 to 72.

74. A computer program product stored on a non-transitory computer readable media, the computer program product including program code for carrying out the method in any one of clauses 1 to 72.

The fifth set of clauses describes certain features and aspects of the disclosed techniques listed in the previous section, including, for example, items 18-25.

1. A method of video processing, comprising: determining, for a conversion between a current video block of a video and a coded representation of the video, a mode of operation of a generalized bi-prediction (GBi) coding tool in which a prediction of the current video block uses a final predictor corresponding to a non-uniformly weighted sum of predictors from two reference lists; and performing the conversion based on the determining, wherein a field in the coded representation corresponds to the mode of operation and a value of the field indicates whether the GBI coding tool is enabled or disabled for the current video block.

2. The method of clause 1, wherein the field indicates that the GBI coding tool is either enabled or disabled at a slice level, a tile level, or a picture level.

3. The method of clause 1, wherein the field is included is included in a slice header, a tile header, or a picture parameter set.

4. The method of any of clauses 1-3, wherein in a case that a picture of the current video block corresponds to a temporal layer that has a value greater than a threshold, the field indicates that the GBi coding tool is disabled for the current video block.

5. The method of clause 4, wherein the threshold is 3.

6. The method of any of clauses 1-5, wherein the GBi coding tool is disabled for the current video block in a first picture that is unreferenced by a second picture different from the first picture.

7. The method of clause 1, wherein the GBi coding tool is disabled for the current video block that uses a quantization parameter greater than a threshold.

8. A method of video processing, comprising: performing a conversion between a current video block of a video and a coded representation of the video, based on a rule that controls a parameter of a GBi coding tool in which a prediction of the current video block uses a final predictor corresponding to a non-uniformly weighted sum of predictors from two reference lists, wherein the rule specifies that a weighting factor set used by the GBi coding tool is based on i) a temporal layer of a picture including the current video block, ii) a picture quantization parameter of the picture, or iii) a quantization parameter of the current video block.

9. The method of clause 8, wherein the rule specifies to use fewer weighting factors in higher temporal layer video pictures.

10. The method of clause 8, wherein the rule specifies to use fewer weighting factors for higher quantization parameter values.

11. The method of clause 8, wherein the coded representation further includes at least one additional weighting factor set for use by the GBi coding tool.

12. The method of clause 11, wherein the additional weighting factor set is indicated at a slice header level, a tile group header level, a tile header level, a picture header level, a picture parameter set level, a sequence parameter set level, or a video parameter set level.

13. A method of video processing, comprising: determining, for a conversion between a current video block of a video and a coded representation of the video, to use a weight that is unequal to one for an uni-prediction mode; and performing the conversion based on the determining, wherein a prediction of the current video block uses a final predictor corresponding to predictors scaled by the weight, and wherein a weighting factor set is selected at a block level or a coding unit level.

14. The method of clause 13, wherein a weight index is signaled for at least one of an AMVP (Advanced Motion Vector Prediction) mode or an affine inter mode, and the weight index is inherited in at least one of a merge mode, an UMVE (Ultimate Motion Vector Expression) mode, an affine merge mode, or affine merge mode with offsets, and wherein the UMVE mode comprises a motion vector expression that includes a starting point, a motion magnitude and a motion direction for the current video block.

15. The method of any of clauses 1-14, wherein the performing of the conversion includes refining a motion compensation block computed during the conversion using an offset value from one of multiple offset sets.

16. The method of clause 15, wherein an offset index is signaled at a block level or coding unit level.

17. The method of clause 15, wherein an offset index is inherited in at least one of a merge mode, an UMVE (Ultimate Motion Vector Expression) mode, an affine merge mode, or affine merge mode with offsets, and wherein the UMVE mode comprises a motion vector expression that includes a starting point, a motion magnitude and a motion direction for the current video block.

18. A method of video processing, comprising: performing a conversion between a current video block of a video and a coded representation of the video, based on a rule that controls a parameter of a GBi coding tool in which a prediction of the current video block uses a final predictor corresponding to a non-uniformly weighted sum of predictors from two reference lists, wherein the rule specifies to select or derive a weighting factor for the GBi coding tool based on neighboring pixels of the current video block and corresponding reference neighboring pixels identified by motion vectors or integer part of the motion vectors of the current video block.

19. The method of clause 18, wherein a signaling of the GBi index is omitted.

20. The method of clause 18, wherein the field in the coded representation indicates whether to use a default equal weighting factor or a selected or derived weighting factor.

21. The method of clause 18, wherein a weighting factor for the current video block is selected from a predefined weighting factor set to have a minimum difference between a result of averaging of the reference neighboring pixels from the two reference lists using the weighting factor and the neighboring pixels of the current video block.

22. The method of clause 18, wherein GBi weighting values are derived by S0 and S1, S0 indicating a sum or an average of the neighboring pixels of the current video block and S1 indicating a sum or an average of neighboring pixels of a reference block.

23. A method of video processing, comprising: performing a conversion between a current video block of a video and a coded representation of the video, based on a rule that controls a parameter of a GBi coding tool in which a prediction of the current video block uses a final predictor corresponding to a non-uniformly weighted sum of predictors from two reference lists, wherein the rule specifies to reorder weighting factors for the GBi coding tool based on neighboring pixels of the current video block and corresponding reference neighboring pixels identified by motion vectors or integer part of the motion vectors of the current video block.

24. The method of clause 23, wherein weighting factors for the current video block is reordered based on a difference between a result of averaging of the reference neighboring pixels from the two reference lists using the weighting factor and the neighboring pixels of the current video block.

25. A method of video processing, comprising: performing a conversion between a current video block of a video and a coded representation of the video, based on a rule that controls a parameter of a GBi coding tool in which a prediction of the current video block uses a final predictor corresponding to a non-uniformly weighted sum of predictors from two reference lists, wherein a rule specifies to use local illumination compensation (LIC) parameters associated with the current video block for determining a weighting factor for the GBi coding tool, and wherein the LIC parameters are derived to use a linear model of illumination changes in the current block during the conversion.

26. The method of clause 25, wherein offsets to derive the LIC parameters are zero and only the weighting factor is used in the GBi coding tool.

27. The method of clause 25, wherein both an offset and the weighting factor of the LIC parameters are used in the GBi coding tool.

28. The method of clause 25, wherein the rule specifies to inherit a GBi index for the current video block from that of a neighboring video block in a case that the current video block also uses at least one of a merge mode, an UMVE mode, an affine merge mode, or an affine merge mode with offsets, and wherein the UMVE mode comprises a motion vector expression that includes a starting point, a motion magnitude and a motion direction for the current video block.

29. The method of clause 25, wherein the rule specifies to derive additional LIC parameters for the conversion of the current video block in a case that an inherited neighboring weighting factor is same as the LIC parameters.

30. The method of any of clauses 1-29, wherein the performing of the conversion includes generating the coded representation from the current block.

31. The method of any of clauses 1-29, wherein the performing of the conversion includes generating the current block from the coded representation.

32. An apparatus in a video system comprising a processor and a non-transitory memory with instructions thereon, wherein the instructions upon execution by the processor, cause the processor to implement the method in any one of clauses 1 to 31.

33. A computer program product stored on a non-transitory computer readable media, the computer program product including program code for carrying out the method in any one of clauses 1 to 31.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of video processing, comprising:
    determining, for a conversion between a current video block of a video and a bitstream of the video, a mode of operation of an affine ultimate motion vector expression (UMVE) mode; and
    performing the conversion based on the determining;
    wherein the current video block is coded with an affine merge mode and motion vector differences in the affine UMVE mode that includes a starting point of motion information, a motion magnitude and a motion direction for the current video block;
    wherein one or more fields in the bitstream correspond to the mode of operation; and
    wherein the one or more fields include: a list size field that indicates a size of a base affine merge candidate list for an affine merge mode with prediction offsets that is used by the UMVE mode, wherein the one or more fields further include a sub-block merge list size field whose value indicates a size of a candidate list for a sub-block merge mode, and wherein the size of the base affine merge candidate list for the affine UMVE mode is less than or equal to the size of the candidate list for the sub-block merge mode, or
    wherein the one or more fields include a table field that signals a distance table or a direction table for the affine merge mode with prediction offsets, wherein the table field signals a size K1 of the distance table, and a size K2 of the direction table, and wherein first K1 elements of the distance table or first K2 elements of the direction table are valid.

2. The method of claim 1, wherein the starting point is indicated by an index to a base affine merge candidate list and final motion information is dependent on the motion vector differences represented by the motion direction and the motion magnitude.

3. The method of claim 1, wherein the one or more fields are included at a slice header level, a tile group header level, a tile header level, a picture header level, a picture parameter set level, a sequence parameter set level, or a video parameter set level.

4. The method of claim 1, wherein the size of the base affine merge candidate list is set to 1, 2, or 3.

5. The method of claim 1, wherein the list size field is omitted from the bitstream.

6. The method of claim 5, wherein the size of the base affine merge candidate list for the affine UMVE mode is equal to the size of the candidate list for the sub-block merge mode.

7. The method of claim 1, wherein the affine UMVE mode corresponds to an affine merge mode modified based on the UMVE mode.

8. The method of claim 1, wherein last K1 elements of the distance table or last K2 elements of the direction table are valid.

9. The method of claim 1, wherein the performing of the conversion includes encoding the current video block into the bitstream.

10. method of claim 1, wherein the performing of the conversion includes decoding the current video block from the bitstream.

11. An apparatus of video processing comprising a processor and a non-transitory memory with instructions thereon, wherein the instructions upon execution by the processor, cause the processor to:
determine for a conversion between a current video block of a video and a bitstream of the video, a mode of operation of an affine ultimate motion vector expression (UMVE) mode; and
perform the conversion based on the determining;
wherein the current video block is coded with an affine merge mode and motion vector differences in the affine UMVE mode that includes a starting point of motion information, a motion magnitude and a motion direction for the current video block;
wherein one or more fields in the bitstream correspond to the mode of operation; and
wherein the one or more fields include: a list size field that indicates a size of a base affine merge candidate list for an affine merge mode with prediction offsets that is used by the UMVE mode, wherein the one or more fields further include a sub-block merge list size field whose value indicates a size of a candidate list for a sub-block merge mode, and wherein the size of the base affine merge candidate list for the affine UMVE mode is less than or equal to the size of the candidate list for the sub-block merge mode, or
wherein the one or more fields include a table field that signals a distance table or a direction table for the affine merge mode with prediction offsets, wherein the table field signals a size K1 of the distance table, and a size K2 of the direction table, and wherein first K1 elements of the distance table or first K2 elements of the direction table are valid.

12. The apparatus of claim 11, wherein the starting point is indicated by an index to a base affine merge candidate list and final motion information is dependent on the motion vector differences represented by the motion direction and the motion magnitude.

13. The apparatus of claim 11, wherein the one or more fields are included at a slice header level, a tile group header level, a tile header level, a picture header level, a picture parameter set level, a sequence parameter set level, or a video parameter set level.

14. The apparatus of claim 11, wherein the size of the base affine merge candidate list is set to 1, 2, or 3.

15. A non-transitory computer-readable recording medium storing a bitstream of a video which is generated by a method performed by a video processing apparatus, wherein the method comprises:
determining, for a conversion between a current video block of a video and a bitstream of the video, a mode of operation of an affine ultimate motion vector expression (UMVE) mode; and
generating the bitstream based on the determining;
wherein the current video block is coded with an affine merge mode and motion vector differences in the affine UMVE mode that includes a starting point of motion information, a motion magnitude and a motion direction for the current video block;
wherein one or more fields in the bitstream correspond to the mode of operation; and
wherein the one or more fields includes a list size field that indicates a size of a base affine merge candidate list for an affine merge mode with prediction offsets that is used by the UMVE mode, wherein the one or more fields further include a sub-block merge list size field whose value indicates a size of a candidate list for a sub-block merge mode, and wherein the size of the base affine merge candidate list for the affine UMVE mode is less than or equal to the size of the candidate list for the sub-block merge mode, or
wherein the one or more fields include a table field that signals a distance table or a direction table for the affine merge mode with prediction offsets, wherein the table field signals a size K1 of the distance table, and a size K2 of the direction table, and wherein first K1 elements of the distance table or first K2 elements of the direction table are valid.

16. The non-transitory computer-readable recording medium of claim 15, wherein the starting point is indicated by an index to a base affine merge candidate list and final motion information is dependent on the motion vector differences represented by the motion direction and the motion magnitude.

17. The non-transitory computer-readable recording medium of claim 15, wherein the one or more fields are included at a slice header level, a tile group header level, a tile header level, a picture header level, a picture parameter set level, a sequence parameter set level, or a video parameter set level.

18. The non-transitory computer-readable recording medium of claim 15, wherein the size of the base affine merge candidate list is set to 1, 2, or 3.

* * * * *